(12) United States Patent
Degrendel et al.

(10) Patent No.: US 7,876,893 B2
(45) Date of Patent: Jan. 25, 2011

(54) LOGIC CIRCUIT AND METHOD FOR CALCULATING AN ENCRYPTED RESULT OPERAND

(75) Inventors: Antoine Degrendel, Munich (DE); Winfried Kamp, Munich (DE); Manfred Roth, Munich (DE); Thomas Kodytek, Munich (DE)

(73) Assignee: Infineon Technologies AG (DE)

( * ) Notice: Subject to any disclaimer, the term of this patent is extended or adjusted under 35 U.S.C. 154(b) by 1146 days.

(21) Appl. No.: 11/462,144

(22) Filed: Aug. 3, 2006

(65) Prior Publication Data

US 2010/0329446 A1 Dec. 30, 2010

Related U.S. Application Data

(60) Provisional application No. 60/756,877, filed on Jan. 5, 2006.

(30) Foreign Application Priority Data

Aug. 8, 2005 (DE) ........................ 10 2005 037 357

(51) Int. Cl.
*H04L 9/28* (2006.01)
(52) U.S. Cl. .......................................... 380/28; 380/42
(58) Field of Classification Search ............. 380/28–30, 380/44, 47, 42, 37; 326/98, 83, 112, 17, 326/95, 52–55
See application file for complete search history.

(56) References Cited

U.S. PATENT DOCUMENTS 6,069,497 A 5/2000 Blomgren et al.
6,107,835 A 8/2000 Blomgren et al.

6,236,240 B1 5/2001 Hill
6,329,846 B1 12/2001 Davies et al.

(Continued)

FOREIGN PATENT DOCUMENTS

DE 013 44 647 B3 7/1935

(Continued)

OTHER PUBLICATIONS

Thomas Popp, et al., "Masked Dual-Rail Pre-Charge Logic: DPA-Resistant Circuits without Routing Constraints," Institute for Applied Information Processing and Communications, Austria, Aug. 31, 2005.

(Continued)

*Primary Examiner*—Nirav Patel
(74) *Attorney, Agent, or Firm*—Dickstein Shapiro LLP

(57) ABSTRACT

A logic circuit for calculating an encrypted dual-rail result operand from encrypted dual-rail input operands according to a combination rule includes inputs for receiving the input operands and an output for outputting the encrypted result operand. Each operand may comprise a first logic state or a second logic state. The logic circuit comprises a first logic stage connected between the inputs and an intermediate node and a second logic stage connected between the intermediate node and the output. The logic stages are formed to calculate the first or second logic state of the encrypted result operand from the input operands according to the combination rule and to maintain or change exactly once the logic state of the encrypted result operand, independently of an order of arrival of the encrypted input operands, depending on the combination rule, in order to impress the calculated first logic state or second logic state on the output.

31 Claims, 19 Drawing Sheets

U.S. PATENT DOCUMENTS

| | | | |
|---|---|---|---|
| 6,765,410 | B2 | 7/2004 | Meneghini |
| 7,071,725 | B2* | 7/2006 | Fujisaki ..................... 326/8 |
| 7,358,769 | B2* | 4/2008 | Roemer et al. ............. 326/55 |
| 7,545,933 | B2* | 6/2009 | Kunemund ................. 380/44 |
| 7,567,668 | B2* | 7/2009 | Gammel et al. ............ 380/28 |
| 7,613,763 | B2* | 11/2009 | Elbe et al. ................ 708/710 |
| 7,693,930 | B2 | 4/2010 | Karaki |
| 2002/0101262 | A1* | 8/2002 | Taki ........................... 326/83 |
| 2002/0169968 | A1 | 11/2002 | Gammel et al. |
| 2003/0218475 | A1 | 11/2003 | Gammel |
| 2007/0030031 | A1* | 2/2007 | Degrendel et al. ......... 326/95 |

OTHER PUBLICATIONS

Stefan Mangard, et al., "Side Cannel Leakage of Masked CMOS Gates," Institute for Applied Information Processing and Communications, Austria, Feb. 14, 2005.

Article by Elena Trichina, "Combinational Logic Design for AES Subbyte Transformation on Masked Data", pp. 1-13 (Nov. 11, 2003) (no additional identifying information about this article is known to applicant at this time).

\* cited by examiner

FIG 3

| XOR2 FUNCTION | AM | AM_N | BM | BM_N | M | M_N | ZM | ZM_N |
|---|---|---|---|---|---|---|---|---|
| A/B/M=0/0/0 | 0 | 0 | 0 | 0 | 0 | 0 | 0 | 0 |
| A/B/M=I/-/- | 0 | 0 | - | - | - | - | - | - |
| A/B/M=-/I/- | - | - | 0 | 0 | - | - | - | - |
| A/B/M=-/-/I | - | - | - | - | 0 | 0 | - | - |
| A/B/M=0/0/0 | 0 | 1 | 0 | 1 | 0 | 1 | 0 | 1 |
| A/B/M=0/0/1 | 0 | 1 | 0 | 1 | 1 | 0 | 1 | 0 |
| A/B/M=0/1/0 | 0 | 1 | 1 | 0 | 0 | 1 | 1 | 0 |
| A/B/M=0/1/1 | 0 | 1 | 1 | 0 | 1 | 0 | 0 | 1 |
| A/B/M=1/0/0 | 1 | 0 | 0 | 1 | 0 | 1 | 1 | 0 |
| A/B/M=1/0/1 | 1 | 0 | 0 | 1 | 1 | 0 | 0 | 1 |
| A/B/M=1/1/0 | 1 | 0 | 1 | 0 | 0 | 1 | 0 | 1 |
| A/B/M=1/1/1 | 1 | 0 | 1 | 0 | 1 | 0 | 1 | 0 |

FIG 4

AND2

| $a_m$ | $an_m$ | $b_m$ | $bn_m$ | m | mn | $q_m$ | $qn_m$ |
|---|---|---|---|---|---|---|---|
| 0 | 0 | 0 | 0 | 0 | 0 | 0 | 0 |
| 0 | 0 | 0 | 0 | 0 | 1 | 0 | 0 |
| 0 | 0 | 0 | 0 | 1 | 0 | 0 | 0 |
| 0 | 0 | 0 | 1 | 0 | 0 | 0 | 0 |
| 0 | 0 | 0 | 1 | 0 | 1 | 0 | d1 |
| 0 | 0 | 0 | 1 | 1 | 0 | 0 | 0 |
| 0 | 0 | 1 | 0 | 0 | 0 | 0 | 0 |
| 0 | 0 | 1 | 0 | 0 | 1 | 0 | 0 |
| 0 | 0 | 1 | 0 | 1 | 0 | d4 | 0 |
| 0 | 1 | 0 | 0 | 0 | 0 | 0 | 0 |
| 0 | 1 | 0 | 0 | 0 | 1 | 0 | d2 |
| 0 | 1 | 0 | 0 | 1 | 0 | 0 | 0 |
| 0 | 1 | 0 | 1 | 0 | 0 | 0 | d3 |
| 0 | 1 | 0 | 1 | 0 | 1 | 0 | 1 |
| 0 | 1 | 0 | 1 | 1 | 0 | 0 | 1 |
| 0 | 1 | 1 | 0 | 0 | 0 | 0 | 0 |
| 0 | 1 | 1 | 0 | 0 | 1 | 0 | 1 |
| 0 | 1 | 1 | 0 | 1 | 0 | 1 | 0 |
| 1 | 0 | 0 | 0 | 0 | 0 | 0 | 0 |
| 1 | 0 | 0 | 0 | 0 | 1 | 0 | 0 |
| 1 | 0 | 0 | 0 | 1 | 0 | d5 | 0 |
| 1 | 0 | 0 | 1 | 0 | 0 | 0 | 0 |
| 1 | 0 | 0 | 1 | 0 | 1 | 0 | 1 |
| 1 | 0 | 0 | 1 | 1 | 0 | 1 | 0 |
| 1 | 0 | 1 | 0 | 0 | 0 | d6 | 0 |
| 1 | 0 | 1 | 0 | 0 | 1 | 1 | 0 |
| 1 | 0 | 1 | 0 | 1 | 0 | 1 | 0 |

$q_m = a_m \cdot b_m + a_m \cdot m + b_m \cdot m$
$qn_m = an_m \cdot bn_m + an_m \cdot mn + bn_m \cdot mn$

FIG 5

XOR2

| $a_m$ | $an_m$ | $b_m$ | $bn_m$ | $m$ | $mn$ | $q_m$ | $qn_m$ |
|---|---|---|---|---|---|---|---|
| 0 | 0 | 0 | 0 | 0 | 0 | 0 | 0 |
| 0 | 0 | 0 | 0 | 0 | 1 | 0 | 0 |
| 0 | 0 | 0 | 0 | 1 | 0 | 0 | 0 |
| 0 | 0 | 0 | 1 | 0 | 0 | 0 | 0 |
| 0 | 0 | 0 | 1 | 0 | 1 | 0 | 0 |
| 0 | 0 | 0 | 1 | 1 | 0 | 0 | 0 |
| 0 | 0 | 1 | 0 | 0 | 0 | 0 | 0 |
| 0 | 0 | 1 | 0 | 0 | 1 | 0 | 0 |
| 0 | 0 | 1 | 0 | 1 | 0 | 0 | 0 |
| 0 | 1 | 0 | 0 | 0 | 0 | 0 | 0 |
| 0 | 1 | 0 | 0 | 0 | 1 | 0 | 0 |
| 0 | 1 | 0 | 0 | 1 | 0 | 0 | 0 |
| 0 | 1 | 0 | 1 | 0 | 0 | 0 | 0 |
| 0 | 1 | 0 | 1 | 0 | 1 | 0 | 1 |
| 0 | 1 | 0 | 1 | 1 | 0 | 1 | 0 |
| 0 | 1 | 1 | 0 | 0 | 0 | 0 | 0 |
| 0 | 1 | 1 | 0 | 0 | 1 | 1 | 0 |
| 0 | 1 | 1 | 0 | 1 | 0 | 0 | 1 |
| 1 | 0 | 0 | 0 | 0 | 0 | 0 | 0 |
| 1 | 0 | 0 | 0 | 0 | 1 | 0 | 0 |
| 1 | 0 | 0 | 0 | 1 | 0 | 0 | 0 |
| 1 | 0 | 0 | 1 | 0 | 0 | 0 | 0 |
| 1 | 0 | 0 | 1 | 0 | 1 | 1 | 0 |
| 1 | 0 | 0 | 1 | 1 | 0 | 0 | 1 |
| 1 | 0 | 1 | 0 | 0 | 0 | 0 | 0 |
| 1 | 0 | 1 | 0 | 0 | 1 | 0 | 1 |
| 1 | 0 | 1 | 0 | 1 | 0 | 1 | 0 |

$q_m = a_m \cdot b_m \cdot m + an_m \cdot bn_m \cdot m + an_m \cdot b_m \cdot mn + a_m \cdot bn_m \cdot mn$ $qn_m = an_m \cdot b_m \cdot m + a_m \cdot bn_m \cdot m + a_m \cdot b_m \cdot mn + an_m \cdot bn_m \cdot mn$

FIG 6

XOR 3

| $a_m$ | $an_m$ | $b_m$ | $bn_m$ | $c_m$ | $cn_m$ | m | mn | $q_m$ | $qn_m$ |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 1 | 0 | 0 |
| 0 | 0 | 0 | 0 | 0 | 0 | 1 | 0 | 0 | 0 |
| 0 | 0 | 0 | 0 | 0 | 1 | 0 | 0 | 0 | 0 |
| 0 | 0 | 0 | 0 | 0 | 1 | 0 | 1 | 0 | 0 |
| 0 | 0 | 0 | 0 | 0 | 1 | 1 | 0 | 0 | 0 |
| 0 | 0 | 0 | 0 | 1 | 0 | 0 | 0 | 0 | 0 |
| 0 | 0 | 0 | 0 | 1 | 0 | 0 | 1 | 0 | 0 |
| 0 | 0 | 0 | 0 | 1 | 0 | 1 | 0 | 0 | 0 |
| 0 | 0 | 0 | 1 | 0 | 0 | 0 | 0 | 0 | 0 |
| 0 | 0 | 0 | 1 | 0 | 0 | 0 | 1 | 0 | 0 |
| 0 | 0 | 0 | 1 | 0 | 0 | 1 | 0 | 0 | 0 |
| 0 | 0 | 0 | 1 | 0 | 1 | 0 | 0 | 0 | 0 |
| 0 | 0 | 0 | 1 | 0 | 1 | 0 | 1 | 0 | 0 |
| 0 | 0 | 0 | 1 | 0 | 1 | 1 | 0 | 0 | 0 |
| 0 | 0 | 0 | 1 | 1 | 0 | 0 | 0 | 0 | 0 |
| 0 | 0 | 0 | 1 | 1 | 0 | 0 | 1 | 0 | 0 |
| 0 | 0 | 0 | 1 | 1 | 0 | 1 | 0 | 0 | 0 |
| 0 | 0 | 1 | 0 | 0 | 0 | 0 | 0 | 0 | 0 |
| 0 | 0 | 1 | 0 | 0 | 0 | 0 | 1 | 0 | 0 |
| 0 | 0 | 1 | 0 | 0 | 0 | 1 | 0 | 0 | 0 |
| 0 | 0 | 1 | 0 | 0 | 1 | 0 | 0 | 0 | 0 |
| 0 | 0 | 1 | 0 | 0 | 1 | 0 | 1 | 0 | 0 |
| 0 | 0 | 1 | 0 | 0 | 1 | 1 | 0 | 0 | 0 |
| 0 | 0 | 1 | 0 | 1 | 0 | 0 | 0 | 0 | 0 |
| 0 | 0 | 1 | 0 | 1 | 0 | 0 | 1 | 0 | 0 |
| 0 | 0 | 1 | 0 | 1 | 0 | 1 | 0 | 0 | 0 |
| 0 | 1 | 0 | 0 | 0 | 0 | 0 | 0 | 0 | 0 |
| 0 | 1 | 0 | 0 | 0 | 0 | 0 | 1 | 0 | 0 |
| 0 | 1 | 0 | 0 | 0 | 1 | 0 | 0 | 0 | 0 |
| 0 | 1 | 0 | 0 | 1 | 0 | 0 | 0 | 0 | 0 |
| 0 | 1 | 0 | 0 | 1 | 0 | 0 | 1 | 0 | 0 |
| 0 | 1 | 0 | 0 | 1 | 1 | 0 | 0 | 0 | 0 |
| 0 | 1 | 0 | 1 | 0 | 0 | 0 | 0 | 0 | 0 |
| 0 | 1 | 0 | 1 | 0 | 0 | 0 | 1 | 0 | 0 |
| 0 | 1 | 0 | 1 | 0 | 1 | 0 | 0 | 0 | 0 |
| 0 | 1 | 0 | 1 | 0 | 0 | 0 | 0 | 0 | 0 |
| 0 | 1 | 0 | 1 | 0 | 0 | 0 | 1 | 0 | 0 |
| 0 | 1 | 0 | 1 | 0 | 1 | 0 | 0 | 0 | d1 |
| 0 | 1 | 0 | 1 | 0 | 1 | 0 | 1 | 0 | 1 |
| 0 | 1 | 0 | 1 | 0 | 1 | 1 | 0 | 0 | 1 |
| 0 | 1 | 0 | 1 | 1 | 0 | 0 | 0 | d2 | 0 |
| 0 | 1 | 0 | 1 | 1 | 0 | 0 | 1 | 1 | 0 |
| 0 | 1 | 0 | 1 | 1 | 0 | 1 | 0 | 1 | 0 |
| 0 | 1 | 1 | 0 | 0 | 0 | 0 | 0 | 0 | 0 |
| 0 | 1 | 1 | 0 | 0 | 0 | 0 | 1 | 0 | 0 |
| 0 | 1 | 1 | 0 | 0 | 0 | 1 | 0 | 0 | 0 |
| 0 | 1 | 1 | 0 | 0 | 1 | 0 | 0 | d3 | 0 |
| 0 | 1 | 1 | 0 | 0 | 1 | 0 | 1 | 1 | 0 |
| 0 | 1 | 1 | 0 | 0 | 1 | 1 | 0 | 1 | 0 |
| 0 | 1 | 1 | 0 | 1 | 0 | 0 | 0 | 0 | d4 |
| 0 | 1 | 1 | 0 | 1 | 0 | 0 | 1 | 0 | 1 |
| 0 | 1 | 1 | 0 | 1 | 0 | 1 | 0 | 0 | 1 |
| 1 | 0 | 0 | 0 | 0 | 0 | 0 | 0 | 0 | 0 |
| 1 | 0 | 0 | 0 | 0 | 0 | 0 | 1 | 0 | 0 |
| 1 | 0 | 0 | 0 | 0 | 0 | 1 | 0 | 0 | 0 |
| 1 | 0 | 0 | 0 | 0 | 1 | 0 | 0 | 0 | 0 |
| 1 | 0 | 0 | 0 | 0 | 1 | 0 | 1 | 0 | 0 |
| 1 | 0 | 0 | 0 | 1 | 1 | 0 | 0 | 0 | 0 |
| 1 | 0 | 0 | 0 | 1 | 0 | 0 | 0 | 0 | 0 |
| 1 | 0 | 0 | 0 | 1 | 0 | 0 | 1 | 0 | 0 |
| 1 | 0 | 0 | 0 | 1 | 0 | 1 | 0 | 0 | 0 |
| 1 | 0 | 0 | 1 | 0 | 0 | 0 | 0 | 0 | 0 |
| 1 | 0 | 0 | 1 | 0 | 0 | 0 | 1 | 0 | 0 |
| 1 | 0 | 0 | 1 | 0 | 0 | 1 | 0 | 0 | 0 |
| 1 | 0 | 0 | 1 | 0 | 1 | 0 | 0 | d5 | 0 |
| 1 | 0 | 0 | 1 | 0 | 1 | 0 | 1 | 1 | 0 |
| 1 | 0 | 0 | 1 | 0 | 1 | 1 | 0 | 1 | 0 |
| 1 | 0 | 0 | 1 | 1 | 0 | 0 | 0 | 0 | d6 |
| 1 | 0 | 0 | 1 | 1 | 0 | 0 | 1 | 0 | 1 |
| 1 | 0 | 0 | 1 | 1 | 0 | 1 | 0 | 0 | 1 |
| 1 | 0 | 1 | 0 | 0 | 0 | 0 | 0 | 0 | 0 |
| 1 | 0 | 1 | 0 | 0 | 0 | 0 | 1 | 0 | 0 |
| 1 | 0 | 1 | 0 | 0 | 0 | 1 | 0 | 0 | 0 |
| 1 | 0 | 1 | 0 | 0 | 1 | 0 | 0 | 0 | d7 |
| 1 | 0 | 1 | 0 | 0 | 1 | 0 | 1 | 0 | 1 |
| 1 | 0 | 1 | 0 | 0 | 1 | 1 | 0 | 0 | 1 |
| 1 | 0 | 1 | 0 | 1 | 0 | 0 | 0 | d8 | 0 |
| 1 | 0 | 1 | 0 | 1 | 0 | 0 | 1 | 1 | 0 |
| 1 | 0 | 1 | 0 | 1 | 0 | 1 | 0 | 1 | 0 |

$q_m = a_m \cdot b_m \cdot c_m + an_m \cdot bn_m \cdot c_m + an_m \cdot b_m \cdot cn_m + a_m \cdot bn_m \cdot cn_m$ $qn_m = an_m \cdot b_m \cdot c_m + a_m \cdot bn_m \cdot c_m + a_m \cdot b_m \cdot cn_m + an_m \cdot bn_m \cdot cn_m$

FIG 7

AND 3

| $a_m$ | $an_m$ | $b_m$ | $bn_m$ | $c_m$ | $cn_m$ | m | mn | $q_m$ | $qn_m$ |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 1 | 0 | 0 |
| 0 | 0 | 0 | 0 | 0 | 0 | 1 | 0 | 0 | 0 |
| 0 | 0 | 0 | 0 | 0 | 1 | 0 | 0 | 0 | 0 |
| 0 | 0 | 0 | 0 | 0 | 1 | 0 | 1 | 0 | d1 |
| 0 | 0 | 0 | 0 | 0 | 1 | 1 | 0 | 0 | 0 |
| 0 | 0 | 0 | 0 | 1 | 0 | 0 | 0 | 0 | 0 |
| 0 | 0 | 0 | 0 | 1 | 0 | 0 | 1 | 0 | 0 |
| 0 | 0 | 0 | 0 | 1 | 0 | 1 | 0 | d2 | 0 |
| 0 | 0 | 0 | 1 | 0 | 0 | 0 | 0 | 0 | 0 |
| 0 | 0 | 0 | 1 | 0 | 0 | 0 | 1 | 0 | d1 |
| 0 | 0 | 0 | 1 | 0 | 0 | 1 | 0 | 0 | 0 |
| 0 | 0 | 0 | 1 | 0 | 1 | 0 | 0 | 0 | 0 |
| 0 | 0 | 0 | 1 | 0 | 1 | 0 | 1 | 0 | d1 |
| 0 | 0 | 0 | 1 | 0 | 1 | 1 | 0 | 0 | 0 |
| 0 | 0 | 0 | 1 | 1 | 0 | 0 | 0 | 0 | 0 |
| 0 | 0 | 0 | 1 | 1 | 0 | 0 | 1 | 0 | d1 |
| 0 | 0 | 0 | 1 | 1 | 0 | 1 | 0 | d2 | 0 |
| 0 | 0 | 1 | 0 | 0 | 0 | 0 | 0 | 0 | 0 |
| 0 | 0 | 1 | 0 | 0 | 0 | 0 | 1 | 0 | 0 |
| 0 | 0 | 1 | 0 | 0 | 0 | 1 | 0 | d2 | 0 |
| 0 | 0 | 1 | 0 | 0 | 1 | 0 | 0 | 0 | 0 |
| 0 | 0 | 1 | 0 | 0 | 1 | 0 | 1 | 0 | d1 |
| 0 | 0 | 1 | 0 | 0 | 1 | 1 | 0 | d2 | 0 |
| 0 | 0 | 1 | 0 | 1 | 0 | 0 | 0 | 0 | 0 |
| 0 | 0 | 1 | 0 | 1 | 0 | 0 | 1 | 0 | 0 |
| 0 | 0 | 1 | 0 | 1 | 0 | 1 | 0 | d2 | 0 |
| 0 | 1 | 0 | 0 | 0 | 0 | 0 | 0 | 0 | 0 |
| 0 | 1 | 0 | 0 | 0 | 0 | 0 | 1 | 0 | d1 |
| 0 | 1 | 0 | 0 | 0 | 1 | 0 | 0 | 0 | 0 |
| 0 | 1 | 0 | 0 | 1 | 0 | 0 | 0 | 0 | 0 |
| 0 | 1 | 0 | 0 | 1 | 0 | 0 | 1 | 0 | d1 |
| 0 | 1 | 0 | 0 | 1 | 1 | 0 | 0 | 0 | 0 |
| 0 | 1 | 0 | 1 | 0 | 0 | 0 | 0 | 0 | 0 |
| 0 | 1 | 0 | 1 | 0 | 0 | 0 | 1 | 0 | d1 |
| 0 | 1 | 0 | 1 | 0 | 1 | 0 | 0 | d2 | 0 |
| 0 | 1 | 0 | 1 | 0 | 0 | 0 | 0 | 0 | 0 |
| 0 | 1 | 0 | 1 | 0 | 0 | 0 | 1 | 0 | d1 |
| 0 | 1 | 0 | 1 | 0 | 0 | 1 | 0 | 0 | 0 |
| 0 | 1 | 0 | 1 | 0 | 1 | 0 | 0 | 0 | d3 |
| 0 | 1 | 0 | 1 | 0 | 1 | 0 | 1 | 0 | 1 |
| 0 | 1 | 0 | 1 | 0 | 1 | 1 | 0 | 0 | 1 |
| 0 | 1 | 0 | 1 | 1 | 0 | 0 | 0 | 0 | 0 |
| 0 | 1 | 0 | 1 | 1 | 0 | 0 | 1 | 0 | 1 |
| 0 | 1 | 0 | 1 | 1 | 0 | 1 | 0 | 1 | 0 |
| 0 | 1 | 1 | 0 | 0 | 0 | 0 | 0 | 0 | 0 |
| 0 | 1 | 1 | 0 | 0 | 0 | 0 | 1 | 0 | d1 |
| 0 | 1 | 1 | 0 | 0 | 1 | 0 | 0 | d2 | 0 |
| 0 | 1 | 1 | 0 | 0 | 1 | 1 | 0 | 0 | 0 |
| 0 | 1 | 1 | 0 | 1 | 0 | 0 | 1 | 0 | 1 |
| 0 | 1 | 1 | 0 | 1 | 1 | 0 | 0 | 0 | 0 |
| 0 | 1 | 1 | 0 | 1 | 0 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 1 | 0 | 0 |
| 1 | 0 | 0 | 0 | 0 | 0 | 1 | 0 | d2 | 0 |
| 1 | 0 | 0 | 0 | 0 | 1 | 0 | 0 | 0 | 0 |
| 1 | 0 | 0 | 0 | 1 | 0 | 0 | 0 | 0 | d1 |
| 1 | 0 | 0 | 0 | 1 | 1 | 0 | 0 | d2 | 0 |
| 1 | 0 | 0 | 1 | 0 | 0 | 0 | 0 | 0 | 0 |
| 1 | 0 | 0 | 1 | 0 | 0 | 0 | 1 | 0 | 0 |
| 1 | 0 | 0 | 1 | 0 | 1 | 0 | 0 | d2 | 0 |
| 1 | 0 | 0 | 1 | 0 | 0 | 0 | 0 | 0 | 0 |
| 1 | 0 | 1 | 0 | 0 | 0 | 0 | 1 | 0 | d1 |
| 1 | 0 | 1 | 0 | 0 | 1 | 0 | 0 | d2 | 0 |
| 1 | 0 | 1 | 0 | 1 | 0 | 0 | 0 | 0 | 0 |
| 1 | 0 | 1 | 0 | 1 | 0 | 0 | 1 | 0 | 1 |
| 1 | 0 | 1 | 0 | 1 | 1 | 0 | 0 | 1 | 0 |
| 1 | 0 | 1 | 1 | 0 | 0 | 0 | 0 | 0 | 0 |
| 1 | 0 | 1 | 1 | 0 | 0 | 0 | 1 | 0 | 1 |
| 1 | 0 | 1 | 1 | 0 | 1 | 0 | 0 | 0 | 0 |
| 1 | 0 | 0 | 0 | 0 | 0 | 0 | 0 | 0 | 0 |
| 1 | 0 | 0 | 0 | 0 | 0 | 0 | 1 | 0 | 0 |
| 1 | 0 | 0 | 0 | 0 | 1 | 0 | 0 | d2 | 0 |
| 1 | 0 | 0 | 0 | 1 | 0 | 0 | 0 | 0 | 0 |
| 1 | 0 | 0 | 1 | 0 | 0 | 0 | 1 | 0 | 1 |
| 1 | 0 | 0 | 1 | 1 | 0 | 0 | 0 | 1 | 0 |
| 1 | 0 | 1 | 0 | 0 | 0 | 0 | 0 | d4 | 0 |
| 1 | 0 | 1 | 0 | 0 | 0 | 0 | 1 | 1 | 0 |
| 1 | 0 | 1 | 0 | 1 | 0 | 1 | 0 | 1 | 0 |

$q_m = a_m \cdot b_m \cdot c_m + a_m \cdot m + b_m \cdot m + c_m \cdot m$ $qn_m = an_m \cdot bn_m \cdot cn_m + an_m \cdot mn + bn_m \cdot mn + cn_m \cdot mn$

FIG 8
MUX

| $a_m$ | $an_m$ | $b_m$ | $bn_m$ | $s_m$ | $sn_m$ | $m$ | $mn$ | $q_m$ | $qn_m$ |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 1 | 0 | 0 |
| 0 | 0 | 0 | 0 | 0 | 0 | 1 | 0 | 0 | 0 |
| 0 | 0 | 0 | 0 | 0 | 1 | 0 | 0 | 0 | 0 |
| 0 | 0 | 0 | 0 | 0 | 1 | 0 | 1 | 0 | 0 |
| 0 | 0 | 0 | 0 | 0 | 1 | 1 | 0 | 0 | 0 |
| 0 | 0 | 0 | 0 | 1 | 0 | 0 | 0 | 0 | 0 |
| 0 | 0 | 0 | 0 | 1 | 0 | 0 | 1 | 0 | 0 |
| 0 | 0 | 0 | 0 | 1 | 0 | 1 | 0 | 0 | 0 |
| 0 | 0 | 0 | 1 | 0 | 0 | 0 | 0 | 0 | 0 |
| 0 | 0 | 0 | 1 | 0 | 0 | 0 | 1 | 0 | 0 |
| 0 | 0 | 0 | 1 | 0 | 0 | 1 | 0 | 0 | 0 |
| 0 | 0 | 0 | 1 | 0 | 1 | 0 | 0 | 0 | 0 |
| 0 | 0 | 0 | 1 | 0 | 1 | 0 | 1 | 0 | 0 |
| 0 | 0 | 0 | 1 | 0 | 1 | 1 | 0 | 0 | d3 |
| 0 | 0 | 0 | 1 | 1 | 0 | 0 | 0 | 0 | 0 |
| 0 | 0 | 0 | 1 | 1 | 0 | 0 | 1 | 0 | d4 |
| 0 | 0 | 0 | 1 | 1 | 0 | 1 | 0 | 0 | 0 |
| 0 | 0 | 1 | 0 | 0 | 0 | 0 | 0 | 0 | 0 |
| 0 | 0 | 1 | 0 | 0 | 0 | 0 | 1 | 0 | 0 |
| 0 | 0 | 1 | 0 | 0 | 0 | 1 | 0 | 0 | 0 |
| 0 | 0 | 1 | 0 | 0 | 1 | 0 | 0 | 0 | 0 |
| 0 | 0 | 1 | 0 | 0 | 1 | 0 | 1 | 0 | 0 |
| 0 | 0 | 1 | 0 | 0 | 1 | 1 | 0 | d5 | 0 |
| 0 | 0 | 1 | 0 | 1 | 0 | 0 | 0 | 0 | 0 |
| 0 | 0 | 1 | 0 | 1 | 0 | 0 | 1 | d6 | 0 |
| 0 | 0 | 1 | 0 | 1 | 0 | 1 | 0 | 0 | 0 |
| 0 | 1 | 0 | 0 | 0 | 0 | 0 | 0 | 0 | 0 |
| 0 | 1 | 0 | 0 | 0 | 0 | 0 | 1 | 0 | 0 |
| 0 | 1 | 0 | 0 | 0 | 0 | 1 | 0 | 0 | 0 |
| 0 | 1 | 0 | 0 | 0 | 1 | 0 | 0 | 0 | 0 |
| 0 | 1 | 0 | 0 | 0 | 1 | 0 | 1 | 0 | d7 |
| 0 | 1 | 0 | 0 | 0 | 1 | 1 | 0 | 0 | 0 |
| 0 | 1 | 0 | 0 | 1 | 0 | 0 | 0 | 0 | 0 |
| 0 | 1 | 0 | 0 | 1 | 0 | 0 | 1 | 0 | 0 |
| 0 | 1 | 0 | 0 | 1 | 0 | 1 | 0 | 0 | d8 |
| 0 | 1 | 0 | 1 | 0 | 0 | 0 | 0 | 0 | d1 |
| 0 | 1 | 0 | 1 | 0 | 0 | 0 | 1 | 0 | d1 |
| 0 | 1 | 0 | 1 | 0 | 0 | 1 | 0 | 0 | d1 |
| 0 | 1 | 0 | 1 | 0 | 1 | 0 | 0 | 0 | d1 |
| 0 | 1 | 0 | 1 | 0 | 1 | 0 | 1 | 0 | 1 |
| 0 | 1 | 0 | 1 | 0 | 1 | 1 | 0 | 0 | 1 |
| 0 | 1 | 0 | 1 | 1 | 0 | 0 | 0 | 0 | d1 |
| 0 | 1 | 0 | 1 | 1 | 0 | 0 | 1 | 0 | 1 |
| 0 | 1 | 0 | 1 | 1 | 0 | 1 | 0 | 0 | 1 |
| 0 | 1 | 1 | 0 | 0 | 0 | 0 | 0 | 0 | 0 |
| 0 | 1 | 1 | 0 | 0 | 0 | 0 | 1 | 0 | 0 |
| 0 | 1 | 1 | 0 | 0 | 0 | 1 | 0 | 0 | 0 |
| 0 | 1 | 1 | 0 | 0 | 1 | 0 | 0 | 0 | 0 |
| 0 | 1 | 1 | 0 | 0 | 1 | 0 | 1 | 0 | 1 |
| 0 | 1 | 1 | 0 | 0 | 1 | 1 | 0 | 1 | 0 |
| 0 | 1 | 1 | 0 | 1 | 0 | 0 | 0 | 0 | 0 |
| 0 | 1 | 1 | 0 | 1 | 0 | 0 | 1 | 1 | 0 |
| 0 | 1 | 1 | 0 | 1 | 0 | 1 | 0 | 0 | 1 |
| 1 | 0 | 0 | 0 | 0 | 0 | 0 | 0 | 0 | 0 |
| 1 | 0 | 0 | 0 | 0 | 0 | 0 | 1 | 0 | 0 |
| 1 | 0 | 0 | 0 | 0 | 1 | 0 | 0 | 0 | 0 |
| 1 | 0 | 0 | 0 | 0 | 1 | 0 | 1 | d9 | 0 |
| 1 | 0 | 0 | 0 | 0 | 1 | 1 | 0 | 0 | 0 |
| 1 | 0 | 0 | 0 | 1 | 0 | 0 | 0 | 0 | 0 |
| 1 | 0 | 0 | 0 | 1 | 0 | 0 | 1 | 0 | 0 |
| 1 | 0 | 0 | 0 | 1 | 0 | 1 | 0 | d10 | 0 |
| 1 | 0 | 0 | 1 | 0 | 0 | 0 | 0 | 0 | 0 |
| 1 | 0 | 0 | 1 | 0 | 0 | 0 | 1 | 0 | 0 |
| 1 | 0 | 0 | 1 | 0 | 0 | 1 | 0 | 0 | 0 |
| 1 | 0 | 0 | 1 | 0 | 1 | 0 | 0 | 0 | 0 |
| 1 | 0 | 0 | 1 | 0 | 1 | 0 | 1 | 1 | 0 |
| 1 | 0 | 0 | 1 | 0 | 1 | 1 | 0 | 0 | 1 |
| 1 | 0 | 0 | 1 | 1 | 0 | 0 | 0 | 0 | 0 |
| 1 | 0 | 0 | 1 | 1 | 0 | 0 | 1 | 0 | 1 |
| 1 | 0 | 0 | 1 | 1 | 0 | 1 | 0 | 1 | 0 |
| 1 | 0 | 1 | 0 | 0 | 0 | 0 | 0 | d2 | 0 |
| 1 | 0 | 1 | 0 | 0 | 0 | 0 | 1 | d2 | 0 |
| 1 | 0 | 1 | 0 | 0 | 0 | 1 | 0 | d2 | 0 |
| 1 | 0 | 1 | 0 | 0 | 1 | 0 | 0 | d2 | 0 |
| 1 | 0 | 1 | 0 | 0 | 1 | 0 | 1 | 1 | 0 |
| 1 | 0 | 1 | 0 | 0 | 1 | 1 | 0 | 1 | 0 |
| 1 | 0 | 1 | 0 | 1 | 0 | 0 | 0 | d2 | 0 |
| 1 | 0 | 1 | 0 | 1 | 0 | 0 | 1 | 1 | 0 |
| 1 | 0 | 1 | 0 | 1 | 0 | 1 | 0 | 1 | 0 |

$$q_m = a_m \cdot sn_m \cdot mn + a_m \cdot s_m \cdot m + b_m \cdot sn_m \cdot m + b_m \cdot s_m \cdot mn$$

$$qn_m = an_m \cdot sn_m \cdot mn + an_m \cdot s_m \cdot m + bn_m \cdot sn_m \cdot m + bn_m \cdot s_m \cdot mn$$

FIG 9
MAJ

| $a_m$ | $an_m$ | $b_m$ | $bn_m$ | $c_m$ | $cn_m$ | m | mn | $q_m$ | $qn_m$ |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 1 | 0 | 0 |
| 0 | 0 | 0 | 0 | 0 | 0 | 1 | 0 | 0 | 0 |
| 0 | 0 | 0 | 0 | 0 | 1 | 0 | 0 | 0 | 0 |
| 0 | 0 | 0 | 0 | 0 | 1 | 0 | 1 | 0 | 0 |
| 0 | 0 | 0 | 0 | 0 | 1 | 1 | 0 | 0 | 0 |
| 0 | 0 | 0 | 0 | 1 | 0 | 0 | 0 | 0 | 0 |
| 0 | 0 | 0 | 0 | 1 | 0 | 0 | 1 | 0 | 0 |
| 0 | 0 | 0 | 0 | 1 | 0 | 1 | 0 | 0 | 0 |
| 0 | 0 | 0 | 1 | 0 | 0 | 0 | 0 | 0 | 0 |
| 0 | 0 | 0 | 1 | 0 | 0 | 0 | 1 | 0 | 0 |
| 0 | 0 | 0 | 1 | 0 | 0 | 1 | 0 | 0 | 0 |
| 0 | 0 | 0 | 1 | 0 | 1 | 0 | 0 | 0 | d1 |
| 0 | 0 | 0 | 1 | 0 | 1 | 0 | 1 | 0 | d1 |
| 0 | 0 | 0 | 1 | 0 | 1 | 1 | 0 | 0 | d1 |
| 0 | 0 | 0 | 1 | 1 | 0 | 0 | 0 | 0 | 0 |
| 0 | 0 | 0 | 1 | 1 | 0 | 0 | 1 | 0 | 0 |
| 0 | 0 | 0 | 1 | 1 | 0 | 1 | 0 | 0 | 0 |
| 0 | 0 | 1 | 0 | 0 | 0 | 0 | 0 | 0 | 0 |
| 0 | 0 | 1 | 0 | 0 | 0 | 0 | 1 | 0 | 0 |
| 0 | 0 | 1 | 0 | 0 | 0 | 1 | 0 | 0 | 0 |
| 0 | 0 | 1 | 0 | 0 | 1 | 0 | 0 | 0 | 0 |
| 0 | 0 | 1 | 0 | 0 | 1 | 0 | 1 | 0 | 0 |
| 0 | 0 | 1 | 0 | 0 | 1 | 1 | 0 | 0 | 0 |
| 0 | 0 | 1 | 0 | 1 | 0 | 0 | 0 | d2 | 0 |
| 0 | 0 | 1 | 0 | 1 | 0 | 0 | 1 | d2 | 0 |
| 0 | 0 | 1 | 0 | 1 | 0 | 1 | 0 | d2 | 0 |
| 0 | 1 | 0 | 0 | 0 | 0 | 0 | 0 | 0 | 0 |
| 0 | 1 | 0 | 0 | 0 | 0 | 0 | 1 | 0 | 0 |
| 0 | 1 | 0 | 0 | 0 | 0 | 1 | 0 | 0 | 0 |
| 0 | 1 | 0 | 0 | 0 | 1 | 0 | 0 | 0 | d1 |
| 0 | 1 | 0 | 0 | 0 | 1 | 0 | 1 | 0 | d1 |
| 0 | 1 | 0 | 0 | 0 | 1 | 1 | 0 | 0 | d1 |
| 0 | 1 | 0 | 0 | 1 | 0 | 0 | 0 | 0 | d1 |
| 0 | 1 | 0 | 0 | 1 | 0 | 0 | 1 | 0 | d1 |
| 0 | 1 | 0 | 0 | 1 | 0 | 1 | 0 | 0 | d1 |
| 0 | 1 | 0 | 1 | 0 | 0 | 0 | 0 | 0 | d1 |
| 0 | 1 | 0 | 1 | 0 | 0 | 0 | 1 | 0 | d1 |
| 0 | 1 | 0 | 1 | 0 | 0 | 1 | 0 | 0 | d1 |
| 0 | 1 | 0 | 1 | 0 | 1 | 0 | 0 | 0 | d1 |
| 0 | 1 | 0 | 1 | 0 | 1 | 0 | 1 | 0 | 1 |
| 0 | 1 | 0 | 1 | 0 | 1 | 1 | 0 | 0 | 1 |
| 0 | 1 | 0 | 1 | 1 | 0 | 0 | 0 | 0 | d1 |
| 0 | 1 | 0 | 1 | 1 | 0 | 0 | 1 | 0 | 1 |
| 0 | 1 | 0 | 1 | 1 | 0 | 1 | 0 | 0 | 1 |
| 0 | 1 | 1 | 0 | 0 | 0 | 0 | 0 | 0 | 0 |
| 0 | 1 | 1 | 0 | 0 | 0 | 0 | 1 | 0 | 0 |
| 0 | 1 | 1 | 0 | 0 | 0 | 1 | 0 | 0 | 0 |
| 0 | 1 | 1 | 0 | 0 | 1 | 0 | 0 | 0 | d1 |
| 0 | 1 | 1 | 0 | 0 | 1 | 0 | 1 | 0 | 1 |
| 0 | 1 | 1 | 0 | 0 | 1 | 1 | 0 | 0 | 1 |
| 0 | 1 | 1 | 0 | 1 | 0 | 0 | 0 | d2 | 0 |
| 0 | 1 | 1 | 0 | 1 | 0 | 0 | 1 | 1 | 0 |
| 0 | 1 | 1 | 0 | 1 | 0 | 1 | 0 | 1 | 0 |
| 1 | 0 | 0 | 0 | 0 | 0 | 0 | 0 | 0 | 0 |
| 1 | 0 | 0 | 0 | 0 | 0 | 0 | 1 | 0 | 0 |
| 1 | 0 | 0 | 0 | 0 | 0 | 1 | 0 | 0 | 0 |
| 1 | 0 | 0 | 0 | 0 | 1 | 0 | 0 | 0 | 0 |
| 1 | 0 | 0 | 0 | 0 | 1 | 0 | 1 | 0 | 0 |
| 1 | 0 | 0 | 0 | 0 | 1 | 1 | 0 | 0 | 0 |
| 1 | 0 | 0 | 0 | 1 | 0 | 0 | 0 | d2 | 0 |
| 1 | 0 | 0 | 0 | 1 | 0 | 0 | 1 | d2 | 0 |
| 1 | 0 | 0 | 0 | 1 | 0 | 1 | 0 | d2 | 0 |
| 1 | 0 | 0 | 1 | 0 | 0 | 0 | 0 | 0 | 0 |
| 1 | 0 | 0 | 1 | 0 | 0 | 0 | 1 | 0 | 0 |
| 1 | 0 | 0 | 1 | 0 | 0 | 1 | 0 | 0 | 0 |
| 1 | 0 | 0 | 1 | 0 | 1 | 0 | 0 | 0 | d1 |
| 1 | 0 | 0 | 1 | 0 | 1 | 0 | 1 | 0 | 1 |
| 1 | 0 | 0 | 1 | 0 | 1 | 1 | 0 | 0 | 1 |
| 1 | 0 | 0 | 1 | 1 | 0 | 0 | 0 | d2 | 0 |
| 1 | 0 | 0 | 1 | 1 | 0 | 0 | 1 | 1 | 0 |
| 1 | 0 | 0 | 1 | 1 | 0 | 1 | 0 | 1 | 0 |
| 1 | 0 | 1 | 0 | 0 | 0 | 0 | 0 | d2 | 0 |
| 1 | 0 | 1 | 0 | 0 | 0 | 0 | 1 | d2 | 0 |
| 1 | 0 | 1 | 0 | 0 | 0 | 1 | 0 | d2 | 0 |
| 1 | 0 | 1 | 0 | 0 | 1 | 0 | 0 | d2 | 0 |
| 1 | 0 | 1 | 0 | 0 | 1 | 0 | 1 | 1 | 0 |
| 1 | 0 | 1 | 0 | 0 | 1 | 1 | 0 | 1 | 0 |
| 1 | 0 | 1 | 0 | 1 | 0 | 0 | 0 | d2 | 0 |
| 1 | 0 | 1 | 0 | 1 | 0 | 0 | 1 | 1 | 0 |
| 1 | 0 | 1 | 0 | 1 | 0 | 1 | 0 | 1 | 0 |

$q_m = a_m \cdot b_m + a_m \cdot c_m + c_m \cdot b_m$
$qn_m = an_m \cdot bn_m + an_m \cdot cn_m + cn_m \cdot bn_m$

FIG 10

ANDOR 21

| $a_m$ | $an_m$ | $b_m$ | $bn_m$ | $c_m$ | $cn_m$ | m | mn | $q_m$ | $qn_m$ |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 1 | 0 | 0 |
| 0 | 0 | 0 | 0 | 0 | 0 | 1 | 0 | 0 | 0 |
| 0 | 0 | 0 | 0 | 0 | 1 | 0 | 0 | 0 | 0 |
| 0 | 0 | 0 | 0 | 0 | 1 | 0 | 1 | 0 | 0 |
| 0 | 0 | 0 | 0 | 0 | 1 | 1 | 0 | 0 | d1 |
| 0 | 0 | 0 | 0 | 1 | 0 | 0 | 0 | 0 | 0 |
| 0 | 0 | 0 | 0 | 1 | 0 | 0 | 1 | d2 | 0 |
| 0 | 0 | 0 | 0 | 1 | 0 | 1 | 0 | 0 | 0 |
| 0 | 0 | 0 | 1 | 0 | 0 | 0 | 0 | 0 | 0 |
| 0 | 0 | 0 | 1 | 0 | 0 | 0 | 1 | 0 | 0 |
| 0 | 0 | 0 | 1 | 0 | 0 | 1 | 0 | 0 | 0 |
| 0 | 0 | 0 | 1 | 0 | 1 | 0 | 0 | 0 | d1 |
| 0 | 0 | 0 | 1 | 0 | 1 | 0 | 1 | 0 | d1 |
| 0 | 0 | 0 | 1 | 0 | 1 | 1 | 0 | 0 | d1 |
| 0 | 0 | 0 | 1 | 1 | 0 | 0 | 0 | 0 | 0 |
| 0 | 0 | 0 | 1 | 1 | 0 | 0 | 1 | d2 | 0 |
| 0 | 0 | 0 | 1 | 1 | 0 | 1 | 0 | 0 | 0 |
| 0 | 0 | 1 | 0 | 0 | 0 | 0 | 0 | 0 | 0 |
| 0 | 0 | 1 | 0 | 0 | 0 | 0 | 1 | 0 | 0 |
| 0 | 0 | 1 | 0 | 0 | 1 | 0 | 0 | 0 | 0 |
| 0 | 0 | 1 | 0 | 0 | 1 | 0 | 0 | 0 | 0 |
| 0 | 0 | 1 | 0 | 0 | 1 | 0 | 1 | 0 | 0 |
| 0 | 0 | 1 | 0 | 0 | 1 | 1 | 0 | 0 | d1 |
| 0 | 0 | 1 | 0 | 1 | 0 | 0 | 0 | d2 | 0 |
| 0 | 0 | 1 | 0 | 1 | 0 | 0 | 1 | d2 | 0 |
| 0 | 0 | 1 | 0 | 1 | 0 | 1 | 0 | d2 | 0 |
| 0 | 1 | 0 | 0 | 0 | 0 | 0 | 0 | 0 | 0 |
| 0 | 1 | 0 | 0 | 0 | 0 | 0 | 1 | 0 | 0 |
| 0 | 1 | 0 | 0 | 0 | 1 | 0 | 0 | 0 | 0 |
| 0 | 1 | 0 | 0 | 0 | 1 | 0 | 0 | 0 | d1 |
| 0 | 1 | 0 | 0 | 0 | 1 | 0 | 1 | 0 | d1 |
| 0 | 1 | 0 | 0 | 1 | 1 | 0 | 0 | 0 | d1 |
| 0 | 1 | 0 | 0 | 1 | 0 | 0 | 0 | 0 | 0 |
| 0 | 1 | 0 | 0 | 1 | 0 | 0 | 1 | d2 | 0 |
| 0 | 1 | 0 | 0 | 1 | 0 | 1 | 0 | 0 | 0 |
| 0 | 1 | 0 | 1 | 0 | 0 | 0 | 0 | 0 | 0 |
| 0 | 1 | 0 | 1 | 0 | 0 | 0 | 1 | 0 | 0 |
| 0 | 1 | 0 | 1 | 0 | 1 | 0 | 0 | 0 | d3 |
| 0 | 1 | 0 | 1 | 0 | 1 | 0 | 0 | 0 | d1 |
| 0 | 1 | 0 | 1 | 0 | 1 | 0 | 1 | 0 | 1 |
| 0 | 1 | 0 | 1 | 0 | 1 | 1 | 0 | 0 | 1 |
| 0 | 1 | 0 | 1 | 1 | 0 | 0 | 0 | 0 | 0 |
| 0 | 1 | 0 | 1 | 1 | 0 | 1 | 0 | 1 | 0 |
| 0 | 1 | 0 | 1 | 1 | 0 | 1 | 0 | 0 | 1 |
| 0 | 1 | 1 | 0 | 0 | 0 | 0 | 0 | 0 | 0 |
| 0 | 1 | 1 | 0 | 0 | 0 | 0 | 1 | 0 | 0 |
| 0 | 1 | 1 | 0 | 0 | 1 | 0 | 0 | 0 | 0 |
| 0 | 1 | 1 | 0 | 0 | 1 | 0 | 1 | 0 | 0 |
| 0 | 1 | 1 | 0 | 0 | 1 | 1 | 0 | 0 | d1 |
| 0 | 1 | 1 | 0 | 1 | 0 | 0 | 1 | 0 | 1 |
| 0 | 1 | 1 | 0 | 1 | 1 | 0 | 0 | 0 | 1 |
| 0 | 1 | 1 | 0 | 1 | 1 | 1 | 0 | d2 | 0 |
| 1 | 0 | 0 | 0 | 0 | 0 | 0 | 0 | 0 | 0 |
| 1 | 0 | 0 | 0 | 0 | 0 | 0 | 1 | 0 | 0 |
| 1 | 0 | 0 | 0 | 0 | 1 | 0 | 0 | 0 | 0 |
| 1 | 0 | 0 | 0 | 0 | 1 | 0 | 1 | 0 | 0 |
| 1 | 0 | 0 | 0 | 1 | 0 | 0 | 0 | 0 | d1 |
| 1 | 0 | 0 | 0 | 1 | 0 | 0 | 0 | d2 | 0 |
| 1 | 0 | 0 | 0 | 1 | 0 | 0 | 1 | d2 | 0 |
| 1 | 0 | 0 | 0 | 1 | 0 | 1 | 0 | d2 | 0 |
| 1 | 0 | 0 | 1 | 0 | 0 | 0 | 0 | 0 | 0 |
| 1 | 0 | 0 | 1 | 0 | 0 | 0 | 1 | 0 | 0 |
| 1 | 0 | 0 | 1 | 0 | 1 | 0 | 0 | 0 | 0 |
| 1 | 0 | 0 | 1 | 0 | 1 | 0 | 0 | 0 | d1 |
| 1 | 0 | 0 | 1 | 0 | 1 | 0 | 1 | 0 | 1 |
| 1 | 0 | 0 | 1 | 0 | 1 | 1 | 0 | 0 | 1 |
| 1 | 0 | 0 | 1 | 1 | 0 | 0 | 0 | d2 | 0 |
| 1 | 0 | 0 | 1 | 1 | 0 | 0 | 1 | 1 | 0 |
| 1 | 0 | 0 | 1 | 1 | 0 | 1 | 0 | 1 | 0 |
| 1 | 0 | 1 | 0 | 0 | 0 | 0 | 0 | 0 | 0 |
| 1 | 0 | 1 | 0 | 0 | 0 | 0 | 1 | d4 | 0 |
| 1 | 0 | 1 | 0 | 0 | 1 | 0 | 0 | 0 | 0 |
| 1 | 0 | 1 | 0 | 0 | 1 | 0 | 0 | 0 | 0 |
| 1 | 0 | 1 | 0 | 0 | 1 | 0 | 1 | 1 | 0 |
| 1 | 0 | 1 | 0 | 0 | 1 | 1 | 0 | 0 | 1 |
| 1 | 0 | 1 | 0 | 1 | 0 | 0 | 0 | d2 | 0 |
| 1 | 0 | 1 | 0 | 1 | 0 | 0 | 1 | 1 | 0 |
| 1 | 0 | 1 | 0 | 1 | 0 | 1 | 0 | 1 | 0 |

$q_m = c_m \cdot mn + a_m \cdot b_m \cdot mn + a_m \cdot c_m + b_m \cdot c_m$
$qn_m = cn_m \cdot m + an_m \cdot bn_m \cdot m + an_m \cdot cn_m + bn_m \cdot cn_m$

| A | B | Z |
|---|---|---|
| 0 | 0 | 0 |
| 0 | 1 | 1 |
| 1 | 0 | 1 |
| 1 | 1 | 0 |

| AM | BM | M | ZM |
|----|----|---|----|
| 0  | 0  | 0 | 0  |
| 0  | 0  | 1 | 1  |
| 0  | 1  | 0 | 1  |
| 0  | 1  | 1 | 0  |
| 1  | 0  | 0 | 1  |
| 1  | 0  | 1 | 0  |
| 1  | 1  | 0 | 0  |
| 1  | 1  | 1 | 1  |

FIG 20
PRIOR ART

| XOR2 FUNCTION | AM | AM_N | BM | BM_N | M | M_N | ZM | ZM_N |
|---|---|---|---|---|---|---|---|---|
| A/B/M=0/0/0 | 0 | 1 | 0 | 1 | 0 | 1 | 0 | 1 |
| A/B/M=0/0/1 | 0 | 1 | 0 | 1 | 1 | 0 | 1 | 0 |
| A/B/M=0/1/0 | 0 | 1 | 1 | 0 | 0 | 1 | 1 | 0 |
| A/B/M=0/1/1 | 0 | 1 | 1 | 0 | 1 | 0 | 0 | 1 |
| A/B/M=1/0/0 | 1 | 0 | 0 | 1 | 0 | 1 | 1 | 0 |
| A/B/M=1/0/1 | 1 | 0 | 0 | 1 | 1 | 0 | 0 | 1 |
| A/B/M=1/1/0 | 1 | 0 | 1 | 0 | 0 | 1 | 0 | 1 |
| A/B/M=1/1/1 | 1 | 0 | 1 | 0 | 1 | 0 | 1 | 0 |

LOGIC CIRCUIT AND METHOD FOR CALCULATING AN ENCRYPTED RESULT OPERAND

CROSS-REFERENCE TO RELATED APPLICATION

This application claims priority from German Patent Application No. 10 2005 037 357.7, which was filed on Aug. 8, 2005, and from Provisional U.S. Patent Application No. 60/756,877, which was filed on Jan. 5, 2006, and which are both incorporated herein by reference in their entirety.

BACKGROUND OF THE INVENTION

1. Field of the Invention

The present invention relates to a logic circuit and a method for calculating a result operand from a first input operand and a second input operand according to a combination rule, wherein the logic circuit and the method may be employed for security-relevant applications, in particular.

2. Description of the Related Art

Circuits employed for the processing of security-relevant data are designed, if possible, so that the data to be processed is protected from attackers attempting to obtain the safety-relevant data by an analysis of the circuit. Due to SPS/DPA (simple power attack/differential power attack) attacks, it is necessary for high-security applications to design the current consumption of an integrated circuit independently of the processed data.

This problem may be solved by a dynamic dual-rail circuit technology the design, characterization, and verification of which is, however, time-consuming. A library based on the dynamic dual-rail circuit technology cannot be synthesized, due to the precharge signals required for a precharge state between the data states, and is not suited for static timing analyses.

A static implementation of circuitry for processing two dual-rail signals is described in the patent document DE 103 44 647 B3. The dual-rail signals have precharge signals with precharge values between valid data values. Valid data values are characterized in that respective logic states inverted with respect to each other exist on both individual signals of the dual-rail signal. Precharge values are characterized in that the same logic states exist on both signals of a dual-rail signal. According to the patent document, the precharge values present at the inputs of the circuitry are passed through onto an output of the circuitry.

The patent document mentioned does not deal with encrypted signals.

In the "masking" technology, internal signals are encrypted by a mask. Here, special new logic cells capable of generating an also encrypted output signal ZM from masked input signals AM and BM as well as a mask M are employed.

FIG. 18 shows a block circuit diagram of such a logic cell with the masked inputs AM, BM, an input for the mask M, and an output for outputting the encrypted output signal ZM.

The underlying masking is described on the basis of FIGS. 19a and 19b.

FIG. 19a shows a table of values for an XOR combination. Here, the signals A, B, Z are not encrypted. The table of values for the XOR2 combination is based on the equation A xor B=Z.

FIG. 19b shows a table of values of an XOR combination for masked signals AM, BM, ZM, wherein the mask M is used. The encryption or masking is an XOR combination of the signals AM, BM, ZM with the value of the mask M. Thus, AM=AM XOR M; BM=BM XOR M; ZM=ZM XOR M applies. The shown table of values of the masked XOR2 combination is based on the equation ((AM xor M) xor (BM xor M)) xor M=ZM.

From the document "Side-Channel Leakage of Masked CMOS Gates; Stefan Mangard, Thomas Popp, Berndt M. Gammel", it is known that possible glitches, i.e. spurious impulses, render the logic vulnerable in a single-rail realization of the masked circuit technology.

One possibility for secure encryption of masked signals consists in a masked dual-rail precharge logic. As with unencrypted dual-rail, the signals encrypted with the mask M and also the mask itself are embodied twice. Thus, there are two dual-rail input signals AM, AMN, and BM, BMN, as well as a dual-rail mask M, MN. Furthermore, an idle phase is introduced between two valid value sequences. The idle phase is a precharge state, or also called "precharge", between two evaluate phases, also called calculation cycles in the following. As with unencrypted dual-rail, an alternating sequence of the two states develops:

Evaluate→Idle→Evaluate→Idle→Evaluate→Idle→Evaluate . . . .

FIG. 20 shows a logic basic function, reduced by precharge states, which has to be realized by a masked dual-rail precharge logic for an XOR combination.

Due to glitches, which occur in every CMOS circuit, a masked dual-rail circuit nevertheless is vulnerable.

In particular, at a transition from a calculation cycle, i.e. a cycle with valid data values at the inputs, to a precharge cycle, i.e. a cycle in which precharge values are present at the input, or at a reverse transition, spurious impulses may occur.

In particular, this is the case when, at the transition from the calculation cycle to the precharge cycle, the precharge value is already present on an input signal, but a valid data value is still present on the other input signal. In this case, a precharge value may already be output at the output, or also still a data value. It is also not impossible that several different data values are output at the output at a transition in the meantime, before finally outputting precharge values at the output. The same problem occurs in the transition from precharge cycle to the calculation cycle. When a valid data value is already present at one of the inputs, but still a precharge value at the other input, it is again open whether already a valid data value, changing data values, or still a precharge value is present at the output. These insecurities may lead to spurious impulses and represent a point of attack for most recent attack scenarios in which it is attempted to recognize different switching time instants and then assess the current course correspondingly by a higher temporal resolution of the current consumption of a circuit.

SUMMARY OF THE INVENTION

The present invention provides a logic circuit and a method for calculating an encrypted result operand from a first encrypted input operand and a second encrypted input operand according to a combination rule, which enable secure processing of the operands.

In accordance with a first aspect, the present invention provides a logic circuit for calculating an encrypted result operand from a first encrypted input operand and a second encrypted input operand according to a combination rule, having: a first input for receiving the first encrypted input operand; a second input for receiving the second encrypted input operand; an output for outputting the encrypted result operand; wherein each operand has a first logic state or a second logic state; at least one first logic stage and at least one second logic stage, wherein the at least one first logic stage is connected between the inputs and an intermediate node, and the at least one second logic stage is connected between the intermediate node and the output, and wherein the logic stages are arranged so that a logic path from one of the inputs of the logic circuit to the output of the logic circuit has an even number of logic stages, and wherein the logic stages are formed to calculate the first or second logic state of the encrypted result operand from the input operands according to the combination rule and impress the same at the output, and wherein the logic circuit is formed that the logic state of the encrypted result operand is maintained or changed exactly once, independently of an order of arrival of the encrypted input operands, depending on the combination rule.

In accordance with a second aspect, the present invention provides a method of calculating an encrypted dual-rail operand from a first encrypted dual-rail input operand and a second encrypted dual-rail input operand according to a combination rule, by: receiving the first encrypted input operand at a first input; receiving the second encrypted input operand at a second input; wherein each operand has a first logic state or a second logic state; calculating the first or second logic state of the encrypted result operand from the input operands according to the combination rule and impressing the first or second logic state of the encrypted result operand at an output, wherein the logic state of the encrypted result operand at the output is maintained or changed exactly once, independently of an order of arrival of the encrypted input operands at the inputs, depending on the combination rule.

The present invention is based on an optimized employment and implementation of known tables of values.

By the applications of generalizations, individual locations of known tables of values of logic functions may be replaced by "don't care". The mapping of such inventively optimized tables of values to a transistor circuit leads to substantially lower transistor numbers, for example, only 24 transistors are still necessary in an XOR2 circuit.

Here, the following effect is taken advantage of:

At the transition form an idle state to a valid value in the evaluate phase, only rising edges can occur:

$(0/0) \rightarrow (1/0)$ $(0/0) \rightarrow (0/1)$

According to definition, no physical signal goes back to low from high in this transition phase.

The same applies to the transition of a valid value to an idle state.

$(1/0) \rightarrow (0/0)$ $(0/1) \rightarrow (0/0)$

Accordingly optimized tables of values in which insecure transitions, which may generate glitches, are replaced by secure states are shown in different embodiments of the present invention.

According to an embodiment of the present invention, for the implementation of the logic circuit employing the optimized values of the table, a two-stage logic having a non-reversible effect is used. Here, the non-reversible effect means that the output of the logic circuit changes its logic value only once or maintains its value at the transition from the calculation state to the precharge state or from the precharge state to the calculation state.

According to one embodiment, the two-stage logic consists of a one-stage logic with a downstream inverter. Such a two-stage logic has the advantage that circuits may be implemented with a very small number of transistors, when it is logic circuits with more than two logic inputs or more complex gates, for example an XOR combination.

The logic circuit is a dual-rail logic circuit working with precharge states, also called precharge or predischarge. In the precharge state, the input operands and/or the result operand have precharge values. Typically, these are values with the same logic states, which do not correspond to any valid data values. In the calculation cycle, the input operands and/or the result operand, however, have valid data values characterized in that a first operand of a dual-rail operand has a first logic state and the second operand of the dual-rail operand has the second logic state inverted thereto. The input operands and the result operand are encrypted or masked with a mask.

According to one embodiment, the dual-rail logic circuit comprises two individual logic circuits, wherein the first logic circuit is formed to calculate the first result operand of the dual-rail result operand from the first operands each of the dual-rail operands. By contrast, the second circuit is formed to calculate the second operand of the dual-rail result operand from the second input operands each of the dual-rail input operands. Both of these circuits are, considered individually, embodied in single-rail technology. According to one embodiment, the structure of both individual circuits is identical, apart from the fact that the inserted transistors are each controlled by the inverted operand of the respective other circuit.

The gate implementations underlying the inventive approach are driven at all times, i.e. there is no dynamic state. Thus, libraries based hereon can be synthesized and are suitable for static timing analysis.

Due to the defined transitions between calculation state and precharge state and vice versa, spurious impulses, short-time bit changes of the result operand, and undefined switching points, which would enable an attacker to draw conclusions on data to be processed, are avoided.

According to the inventive approach, each stage of the logic circuit is realized so that a change from 1 to 0 occurs at the output of the logic stage at a change of an input signal from 0 to 1, and only a change from 0 to 1 occurs at the output of the logic stage at a change of an input signal from 1 to 0.

According to a further embodiment, the logic circuit comprises a multi-stage implementation with more than two logic stages, but wherein it is guaranteed that all paths from the input to the output of the logic circuit pass through an even number of logic stages. In one realization in transistor logic, each of the logic stages may comprise a pull-up network and a pull-down network. The logic stages are connected to each other via one or a plurality of intermediate nodes.

The present invention is based on the finding that, for gates of a masked dual-rail precharge logic, generalizations for the functional behavior of the gates may be performed.

At the transition from the calculation cycle, also called evaluate cycle, to the precharge cycle, also called idle cycle, the following generalizations may be performed. If at least one dual-rail input operand transitions from the calculation state to the precharge state, the dual-rail result operand either also has to transition to the precharge state or has to maintain the existing state.

If further input operand pairs transition to the precharge state, the same applies. No later than when the last input operand pair has transitioned to the precharge state, does the output operand also have to go to the precharge state.

At the transition from the precharge cycle to the calculation cycle, the following generalizations may be performed. If individual dual-rail input operands transition from the precharge state to a calculation state, the dual-rail result operand cannot leave its precharge state before the further dual-rail input operands that are still in the precharge state can no longer change the output operand, when they go to the calculation state themselves. Otherwise, the result operand present at the output of the logic circuit has to remain in the precharge state.

When further input operand pairs transition to the calculation state, the same applies. No later than when the last input operand pair has transitioned to the calculation state, does the result operand also have to go to the calculation state.

BRIEF DESCRIPTION OF THE DRAWINGS

These and other objects and features of the present invention will become clear from the following description taken in conjunction with the accompanying drawings, in which:

FIG. 3 is a table of values of a logic combination according to an embodiment of the present invention;

FIGS. 4-10 are tables of values of further logic combinations according to embodiments of the present invention;

FIG. 20 is a basic table of a logic combination according to the prior art.

DESCRIPTION OF THE PREFERRED EMBODIMENTS

Figure 1:
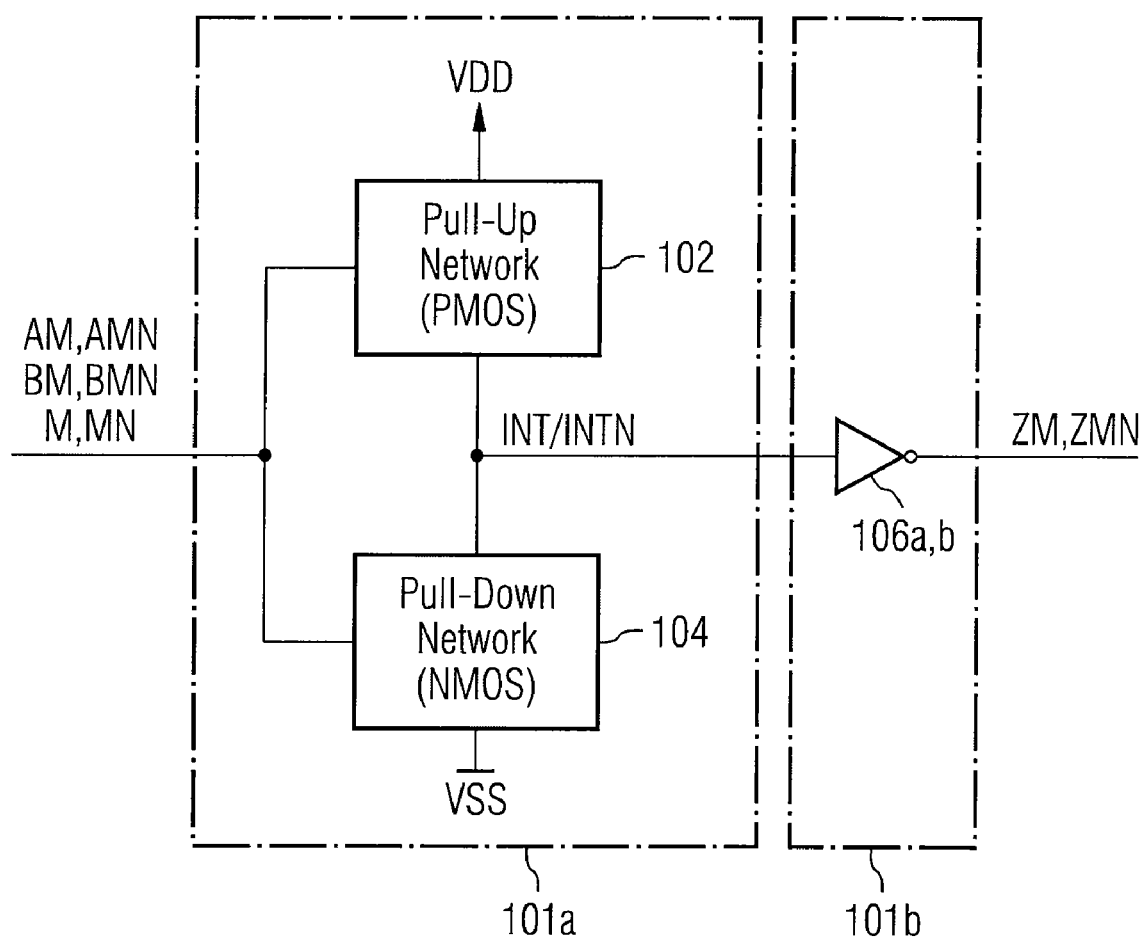
FIG. 1 is a schematic illustration of a circuit according to an embodiment of the present invention.

In the subsequent description of the preferred embodiments of the present invention, the same or similar reference numerals are used for the similarly acting elements illustrated in the various drawings, wherein repeated description of these elements is omitted.

FIG. 1 shows an embodiment of a logic circuit for calculating an encrypted result operand ZM, ZMN from two encrypted input operands AM, AMN and BM, BMN. The calculation of the result operand ZM, ZMN is done according to a combination rule. According to this and the following embodiments, the input operands AM, AMN, BM, BMN as well as the result operands ZM, ZMN are encrypted signals encrypted with an encryption operand in form of a mask M, MN.

The logic circuit may be a dual-rail logic circuit with precharge states. In this case, both the encrypted input operands AM, AMN, BM, BMN, the encryption operand M, MN, as well as the result operands are dual-rail operands supplied to or output from the logic circuit via dual-rail lines as dual-rail signals. Accordingly, the operands have first operands AM, BM, ZM and second operands AMN, BMN, ZMN, wherein the first operands AM, BM, ZM and the second operands AMN, BMN, ZMN have logic states inverted with respect to each other in the calculation state and equal logic states in the precharge state. Likewise, the dual-rail intermediate node INT, INTN has a first node INT and a second node INTN.

The encrypted dual-rail operands AM, AMN, BM, BMN and the encrypted dual-rail result operand ZM, ZMN are encrypted with an encryption operand M, MN in form of a mask according to an encryption rule, wherein the encryption rule is an XOR combination or NXOR combination with the encryption operand M, MN.

To this end, the logic circuit comprises a further input for receiving the encryption operand M, MN.

Alternatively, the encryption operand M, MN may also be guided past the logic circuit, when it is required neither for the decryption of the input operands nor for encrypting the output operand due to the combination rule.

The logic circuit is implemented in a two-stage logic and has a first logic stage 101a and a second logic stage 101b.

The first logic stage 101a comprises a pull-up network 102 and a pull-down network 104. Both networks 102, 104 are formed to receive the dual-rail input operands AM, AMN, BM, BMN. Furthermore, the first logic stage comprises a first potential terminal VDD for a high voltage potential, a second potential terminal VSS for supplying a low voltage potential, and a dual-rail intermediate node INT, INTN.

The pull-up network 102 is connected between the first potential terminal VDD and the dual-rail intermediate node INT, INTN. The pull-up network 102 is formed to calculate first logic states of the dual-rail intermediate node INT, INTN according to the combination rule from the encrypted dual-rail input operands AM, AMN, BM, BMN and the encryption operand M, MN. According to this embodiment, the pull-up network 102 is formed to calculate logic states of the dual-rail intermediate node INT, INTN, which are characterized in that the dual-rail intermediate node INT, INTN is drawn to the high voltage potential VDD by the pull-up network 102.

The pull-down network 104 is connected between the second potential terminal VSS and the dual-rail intermediate node INT, INTN. The pull-down network is formed to calculate second logic states from the input operands AM, AMN, BM, BMN according to the combination rule, taking the encryption operand M, MN into account. According to this embodiment, second logic states are states of the encrypted result operand ZM, ZMN, which are characterized in that the dual-rail intermediate node INT, INTN is drawn to the low voltage potential VSS by the pull-down network.

The second logic stage comprises an inverter pair 106a, 106b connected between the output of the circuit and the intermediate node INT, INTN. The first inverter 106a is formed to invert a logic state of the first node INT of the dual-rail intermediate node and output the same as result operand ZM at the output of the circuit. The second inverter 106b is formed to invert a logic state of the second node INTN of the dual-rail intermediate node and output the same as second output signal ZMN of the dual-rail result operand at the output of the circuit. The signals at the intermediate node INT, INTN that are not inverted yet are already encrypted with the encryption operand M, MN.

In this embodiment, a logically first state is physically realized by a high voltage potential VDD, and a second logic state by a low voltage potential VSS. Alternatively, reverse association is possible.

The decryption of the input operands AM, AMN, BM, BMN and/or the encryption of the output operands ZM, ZMN is done together with the logic combination in one pass, i.e. the input signals AM, AMN, BM, BMN are not at first decrypted and then logically combined, but the logic combination is performed immediately based on the encrypted input signals AM, AMN, BM, BMN, taking the mask M, MN into account. Likewise, an encryption of the output signal ZM, ZMN is not done in a downstream encryption step, but it is performed directly in the logic combination of the encrypted input signals AM, AMN, BM, BMN, taking the mask M, MN into account.

According to this embodiment, the pull-up network is implemented in PMOS technology and the pull-down network in NMOS technology.

When using a one-stage CMOS logic for the first logic stage 101a, due to the physical properties, the effect is achieved that, if a transition from logic 1 to logic 0 occurs on the input operands AM, AMN, BM, BMN, M, MN, only a transition from logic 0 to logic 1 can occur at the intermediate node INT, INTN. Conversely, if a transition from logic 0 to logic 1 occurs at the input AM, AMN, BM, BMN, M, MN, only a transition from logic 1 to logic 0 can occur at the intermediate node INT, INTN. In addition, the structure with more complex gates may thereby be simplified. Furthermore, there is the possibility that signal paths for the two nodes of the intermediate node INT, INTN share transistors. This leads to a reduction in the required area.

The same effect also occurs in the second logic stage 101b, which is also realized as a one-stage CMOS logic.

Figure 2:
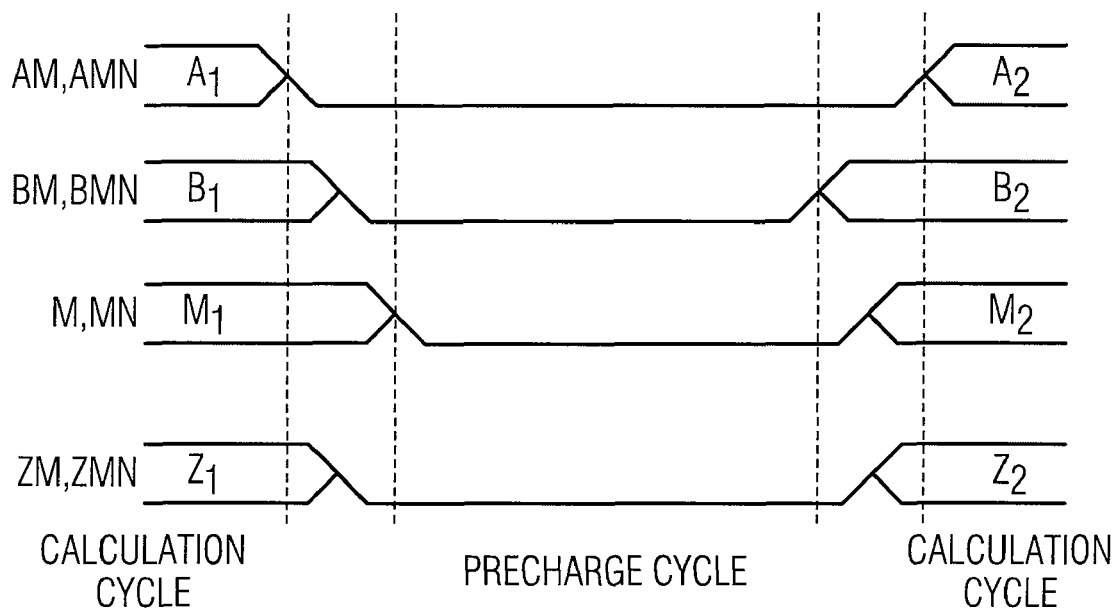
FIG. 2 is a time illustration of calculation cycles and precharge cycles according to an embodiment of the present invention.

FIG. 2 illustrates a transition from the calculation cycle to the precharge cycle and from the precharge cycle to a further calculation cycle. In the calculation cycle, valid values designated by $A_1$, $B_1$, $M_1$ and $Z_1$ in FIG. 2 are present on the input signals AM, AMN, BM, BMN, M, MN as well as on the output signal ZM, ZMN. The signals AM, BM, M, ZM have a logic state 0 or 1 and the accompanying dual-rail signals AMN, BMN, MN, ZMN have the logic state inverted thereto. At the transition from the calculation cycle to the precharge cycle, all signals AM, AMN, BM, BMN, ZM, ZMN take on the same logic value, here logic 0. In these and the following embodiments, the states 0, 0 are assumed as precharge values. In this case, the states 1, 1 are not permitted. Alternatively, the states 1, 1 may also be assumed as precharge values. In this case, the states 0, 0 are not permitted.

By the inventive approach, it is ensured that, at the transition from the calculation state to the precharge state, the result operand transitions to the precharge state at the earliest when the first input operand ZM, ZMN transitions to the precharge state, and transitions to the precharge state at the latest when the last input operand transitions to the precharge state. Furthermore, it is ensured that the output operand ZM, ZMN remains in the precharge state, once it has changed to the precharge state.

It can be seen from FIG. 2 that the result operand ZM, ZMN maintains its state at the transition to the precharge cycle, although the first input operand AM, AMN has already taken on the precharge state. At the change of the second input operand BM, BMN to the precharge state, the result operand ZM, ZMN also changes to the precharge state. Alternatively, it would also be possible for the result operand ZM, ZMN to already change to the precharge state, when the first result operand AM, AMN changes to the precharge state, or only to go to the precharge state, when the last input operand M goes to the precharge state.

Correspondingly, at the transition from the precharge state to the calculation state, it is ensured that the result operand ZM, ZMN transitions to the calculation state only when input signals that still are in the precharge state can no longer change the logic state of the result operand ZM, ZMN. When the last input operand has transitioned to the calculation state at the latest, the result operand also has to transition to the calculation state. According to FIG. 2, the result operand ZM, ZMN remains in the precharge state, although the second input operand BM has already transitioned to the calculation state. The result operand ZM, ZMN changes to the calculation state, when the encryption operand M, MN transitions to the calculation state. If the logic states of the input operands AM, AMN, M, MN were insignificant in the calculation of the result operand ZM, ZMN, the result operand could already transition to the calculation state, when the first input operand, in this case the input operand BM, BMN, transitions to the calculation state. In this case, if the logic state of the first input operand AM, AMN were relevant for the calculation of the logic state of the result operand ZM, ZMN, the result operand ZM, ZMN would be allowed to transition to the calculation state only when the first input operand AM, AMN has transitioned to the calculation state as last input operand. Thus, it is ensured that the logic state of the result operand ZM, ZMN does not fall back to a logic state not corresponding to the final logic state of the result operand on a short-time basis at the transition from the precharge state to the calculation state.

FIG. 3 describes a table of values of an XOR2 function representing an optimized association for masked dual-rail pairs. This is a table of values without security features representing an intermediate step toward a table of values optimized according to the present invention. Here, "I" in the first column of the table describes the idle state, i.e. the precharge state of the respective dual-rail input signal pair. A "don't care" is labeled (–).

From rows 2 to 4 of the table of values it can be seen that the output operand ZM, ZMN of the logic circuit is insignificant if one or more input operands AM, AMN, BM, BMN, M, MN are in the precharge state. This is labeled by (–) in the first three rows of the output operand ZM, ZMN. This description is disadvantageous, because glitches, i.e. spurious impulses, may again develop with the free choice of the don't care states especially in the transition region from the precharge state to the calculation state or from the calculation state to the precharge state.

FIG. 4 shows a table of values according to an embodiment of the present invention for an AND combination between two masked dual-rail input signals $a_m$, $an_m$ and $b_m$, $bn_m$, taking the masking operand m, mn into account. The dual-rail result operand is labeled $q_m$, $qn_m$. In the following equations, the input operands $a_m$, $an_m$ and $b_m$, $bn_m$ are designated with AM, AMN and BM, BMN, and the result operand $q_m$, $qn_m$ with ZM, ZMN.

The table of values shown in FIG. 4 is a table of values optimized according to the inventive approach, which guarantees absence of glitches in a circuit based on this table of values and thus makes the circuit more secure. To this end, don't care states of the result operand $q_m$, $qn_m$ are optimally implemented in the table of values.

In this and the following tables of values, don't care states are designated with the letters "d", i.e. "d1", "d2", "d3", "d4", "d5", "d6", "d7", "d8", "d9", "d10", for example. Don't care states may be replaced by the states logic 1 or 0 in an employment of the table of values in a logic circuit. Here, don't care states with the same numbering are replaced by the same logic state. For example, if a don't care state designated with "d1" is replaced by logic 0, all remaining don't care states designated with "d1" also have to be replaced by logic 0.

In known tables of values, the result operand $q_m$, $qn_m$ may have an undefined state at the transition of the input operands $a_m$, $an_m$, $b_m$, $bn_m$, m, mn from the calculation cycle to the precharge cycle, or vice versa. According to the inventive approach, undefined states of the result operand $q_m$, $qn_m$, which may lead to multiple transitions at the output of the circuit, are eliminated by replacing these special undefined states in the table of values according to the invention by the defined state "0". Thereby, the circuit based on this table of values becomes secure.

If all input operands $a_m$, $an_m$, $b_m$, $bn_m$, m, mn have precharge values, the result operand $q_m$, $qn_m$ also has precharge values.

If all input operands $a_m$, $an_m$, $b_m$, $bn_m$, m, mn have data values, the result operand $q_m$, $qn_m$ also has data values.

If only one or only two of the input operands $a_m$, $an_m$, $b_m$, $bn_m$, m, mn have precharge values, the result operand $q_m$, $qn_m$ is set to the state 0/0 or 0/d or d/0, depending on the combination rule and depending on the values of the input operand(s) $a_m$, $an_m$, $b_m$, $bn_m$, m, mn having data values. Don't care states "d", however, are allowed only when no glitches can result therefrom. By continuing to allow selected don't care states, the circuit outlay reduces significantly as opposed to circuits not permitting don't care states at all.

If the table of values shown in FIG. 4 is regarded as truth table for an AND combination, the truth table can be summarized to the equations $$ZM = AM \cdot BM + AM \cdot M + BM \cdot M$$

$$ZMN = AMN \cdot BMN + AMN \cdot MN + BMN \cdot MN$$

shown in FIG. 4.

These equations represent an optimum employment of the table of values. Due to the don't care states, which may be replaced by "0" or "1", other equations are also possible.

Corresponding to the table of values shown in FIG. 4 and equations for an AND combination, FIGS. 5 to 10 show tables of values and equations for further combination rules.

FIG. 5 shows a table of values according to a further embodiment of the present invention for an XOR combination among masked dual-rail input signals $a_m$, $an_m$ and $b_m$, $bn_m$, taking the masking operand m, mn into account. The dual-rail result operand is designated with $q_m$, $qn_m$.

If this table of values is regarded as truth table for the XOR combination, the truth table shown in FIG. 5 may be summarized to the equations $$ZM = AM \cdot BM \cdot M + AMN \cdot BMN \cdot M + AMN \cdot BM \cdot MN + AM \cdot BMN \cdot MN$$

$$ZMN = AMN \cdot BM \cdot M + AM \cdot BMN \cdot M + AM \cdot BM \cdot MN + AMN \cdot BMN \cdot MN$$

shown in FIG. 5. These equations represent an optimal employment of the table of values. Due to the don't care states, which may be replaced by "0" or "1", other equations are also possible.

FIG. 6 shows a further table of values for an XOR3 combination, which additionally also comprises a third dual-rail input operand $c_m$, $cn_m$.

Here, there are no dependencies of the output on the encryption operands m or mn. Thus, the equations $$ZM = AM \cdot BM \cdot CM + AMN \cdot BMN \cdot CM + AMN \cdot BM \cdot CMN + AM \cdot BMN \cdot CMN$$

$$ZMN = AMN \cdot BM \cdot CM + AM \cdot BMN \cdot CM + AM \cdot BM \cdot CMN + AMN \cdot BMN \cdot CMN$$

shown in FIG. 6 for the result operand develop. This equations exactly corresponds to the equation for the XOR2 combination shown in FIG. 5, when m is exchanged with $c_m$ and mn with $cn_m$.

FIG. 7 shows a table of values for an ANDS combination among three encrypted input operands, taking the masking operand into account. From the table of values, the equations $$ZM = AM \cdot BM \cdot CM + AM \cdot M + BM \cdot M + CM \cdot M$$

$$ZMN = AMN \cdot BMN \cdot CMN + AMN \cdot MN + BMN \cdot MN + CMN \cdot MN$$

shown in FIG. 7 result.

FIG. 8 shows a further table of values for a multiplexer function, in which two dual-rail input operands are multiplexed depending on a select signal $s_m$, $sn_m$, taking the dual-rail masking operand into account. The equations $$ZM = AM \cdot SMN \cdot MN + AM \cdot SM \cdot M + BM \cdot SMN \cdot M + BM \cdot SM \cdot MN$$

$$ZMN = AMN \cdot SMN \cdot MN + AMN \cdot SM \cdot M + BMN \cdot SMN \cdot M + BMN \cdot SM \cdot MN$$

shown in FIG. 8 for the output operands $q_m$, $qn_m$ result.

FIG. 9 shows a table of values for an embodiment of a majority combination among three dual-rail input operands, taking the masking operand into account.

The equations $$ZM = AM \cdot BM + AM \cdot CM + CM \cdot BM$$

$$ZMN = AMN \cdot BMN + AMN \cdot CMN + CMN \cdot BMN$$

shown in FIG. 9 for the output operands $q_m$, $qn_m$ result.

FIG. 10 shows a table of values for an ANDOR21 combination among three dual-rail input operands, taking the dual-rail mask into account. Here, at first two inputs are ANDed, and then the result is ORed with the third input. For the output operands $q_m$, $qn_m$, the equations $$ZM = CM \cdot MN + AM \cdot BM \cdot MN + AM \cdot CM + BM \cdot CM$$

$$ZMN = CMN \cdot M + AMN \cdot BMN \cdot M + AMN \cdot CMN + BMN \cdot CMN$$

shown in FIG. 10 result.

Figure 11:
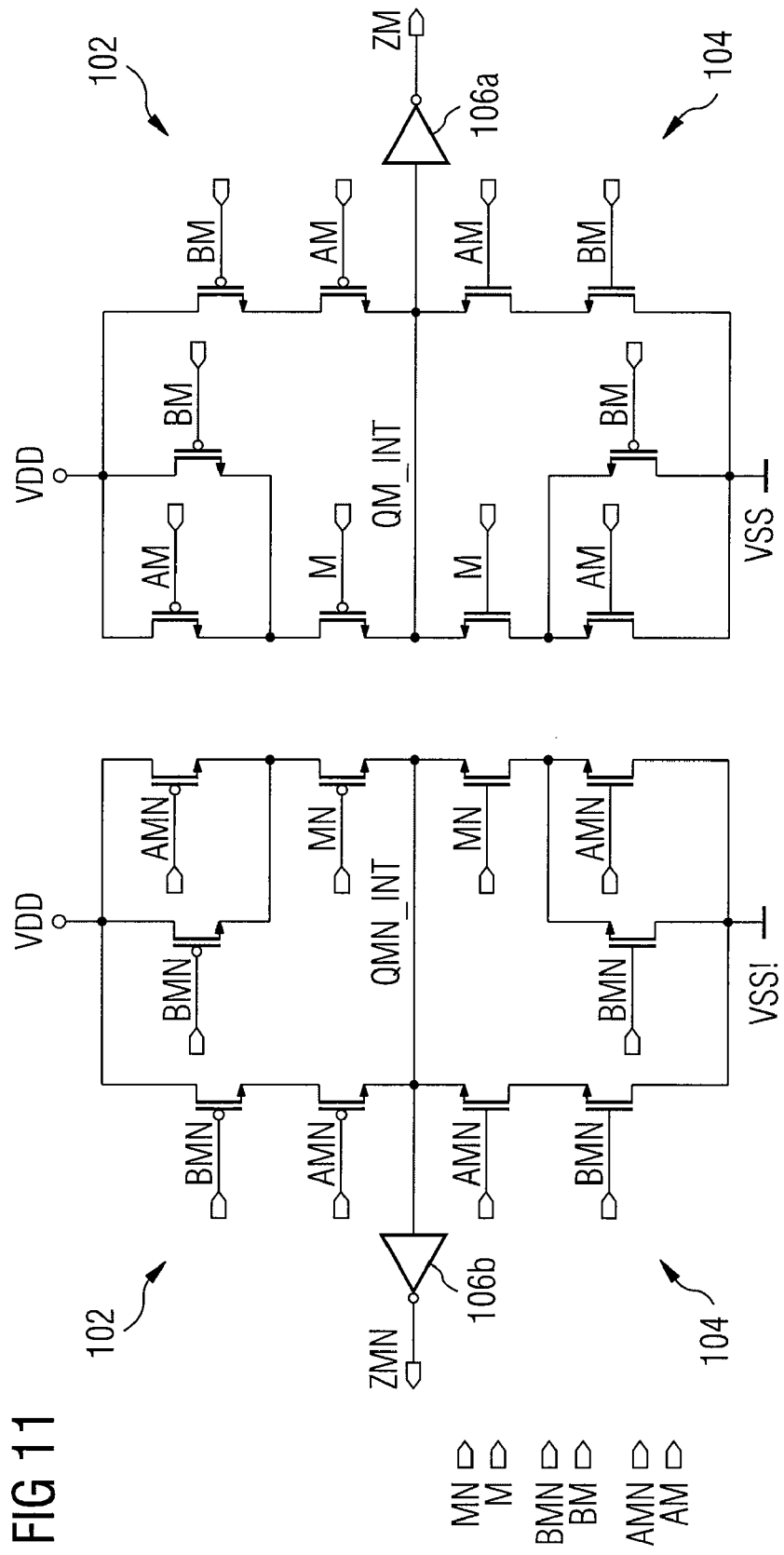
FIGS. 11-17 show logic circuits according to further embodiments of the present invention.
Figure 12:
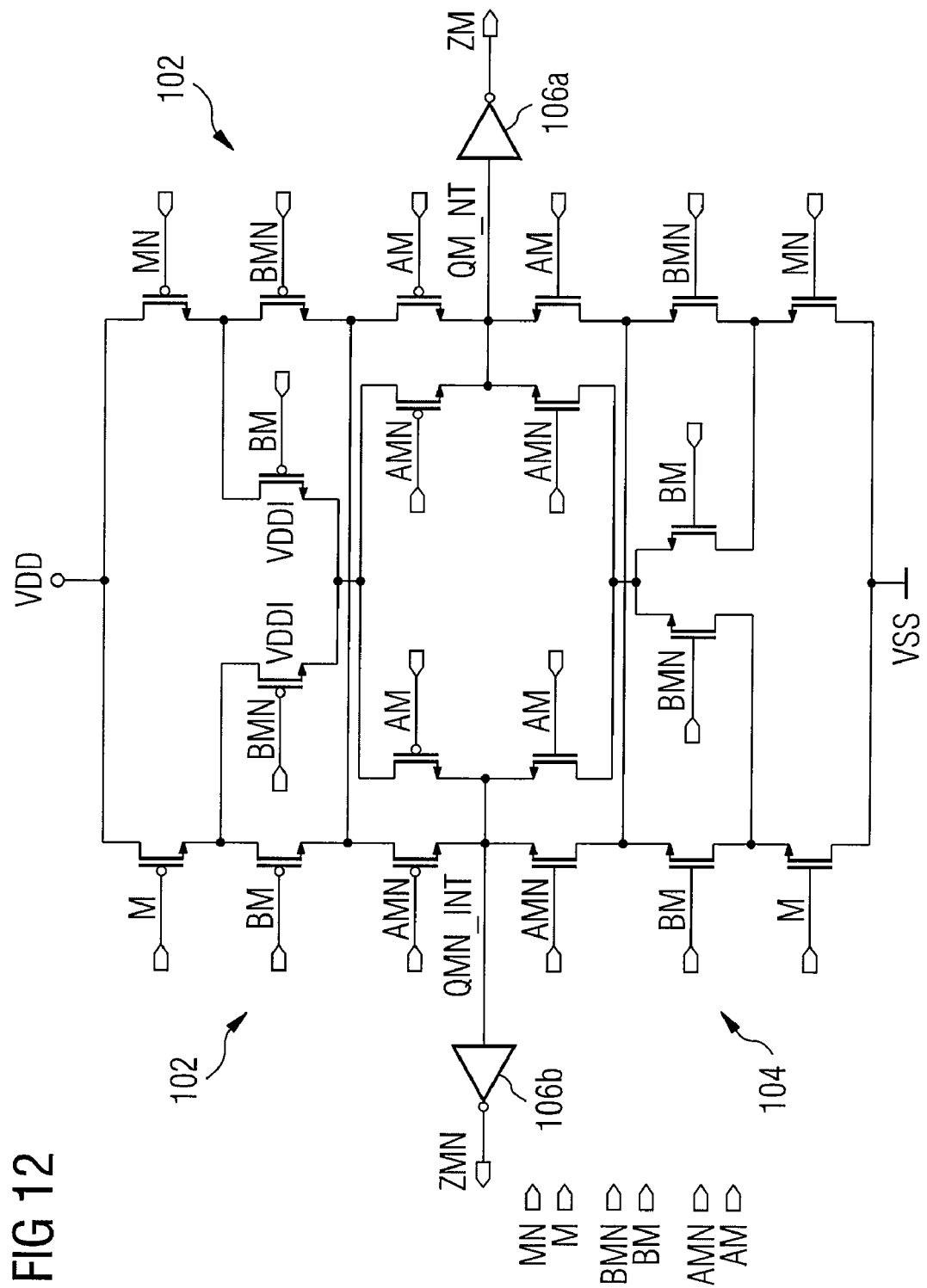

FIGS. 11-17 show detailed circuit diagrams of logic circuits according to embodiments of the present invention. The logic circuits comprise the structure described on the basis of FIG. 1 with a first logic stage consisting of the pull-up network 102 and the pull-down network 104 and a second logic stage consisting of the inverter 106a, b. The inverter 106a, b also comprises a pull-down network and a pull-up network (not shown in the figures). FIGS. 11 and 12 show logic circuits for the combination of two masked dual-rail input operands AM, AMN and BM, BMN, taking the dual-rail encryption operand M, MN into account. FIGS. 13-17 show embodiments with three input operands and the additional encryption operand. The transistor circuits shown in FIGS. 11-17 are based on the foregoing tables and comprise the structure described in FIG. 1 with a pull-down network 104, which maps a "1" of the foregoing tables of values, and a pull-up network 102, which maps a "0" of the foregoing tables of values. To this end, the pull-down networks 104 are connected to the low voltage potential VSS. To this end, the pull-up networks 102 are connected to the high voltage potential VDD. The correspondingly reversed mapping is possible as an alternative. Furthermore, the logic circuits shown in FIGS. 11-17 comprise two output inverters 106a, b each, which are disposed between the intermediate nodes designated with the reference numeral QMN_INT, QM_INT in FIGS. 11-17 and needed to invert the level of the intermediate nodes and provide the same as result operand ZM, ZMN.

Only one of the nodes of the intermediate node each is discharged through the pull-down networks 104.

By always taking on differential values, i.e. 1/0 and 0/1, in the calculation state in the dual-rail circuit technologies, logic inverting of the gate may be achieved by exchanging the two output lines of the output operands ZM, ZMN of the logic circuits shown in FIGS. 11-17. By exchanging the input pairs, i.e. the first input operand AM and the second input operand AMN of the first dual-rail input operand, for example, the input values can be inverted. With this, it is possible to map all logic functions with two inputs with two different pull-down networks 104 and pull-up networks 102. For the mapping of all logic functions with two and three inputs, only four structures are required.

The transistor circuits shown in FIGS. 11-17 are only transistor-reduced as far as equal input load for the two signals of a dual-rail input is also further guaranteed.

The logic circuit shown in FIG. 11 realizes an AND combination among the input operands AM, AMN, BM, BMN, taking the encryption operand M, MN into account. The logic circuit comprises two individual circuits symmetrical with respect to each other, with the first circuit (arranged on the right in FIG. 11) working on the first operands AM, BM, M, ZM of the respective dual-rail input and output operands, and the second logic circuit on the operands AMN, BMN, MN, ZMN inverted with respect thereto. Both logic circuits have a first potential terminal for the high voltage potential VDD and a second potential terminal for the low voltage potential VSS. Preferably, the corresponding potential terminals of the two circuits are electrically connected.

In the following, the logic circuit working on the non-inverted operands AM, BM, M, ZM will be described in detail. The pull-up network 102 of the logic circuit is connected to the high potential terminal VDD on the input side and to the node QM_INT of the intermediate node on the output side. The pull-up network 102 comprises a series connection of two transistors, which is connected between the first potential terminal VDD and the node QM_INT. The first transistor of this series connection is controlled by the first input operand AM and the second transistor by the input operand BM. Furthermore, the pull-up network 102 comprises a parallel connection of two transistors connected to the first voltage terminal VDD with their source terminals and controlled by the first input operand AM and the second input operand BM, respectively. With their drain terminals, the parallel-connected transistors are connected to the node QM_INT via a further transistor controlled by the masking operand M.

The pull-down network 104 is constructed symmetrically to the pull-up network 102, wherein the source terminals of the transistors are connected to the second voltage potential VSS instead of the first voltage potential VDD. The node QM_INT is connected to the inverter 106$a$, which is formed to provide the output operand ZM, the logic state of which is inverted to the logic state of the node QM_INT.

The node QM_INT is drawn to the high voltage potential VDD by the pull-up network 102, when a low voltage potential is present on the input operands AM, BM each, and/or when a low voltage potential is present on one of the input operand AM, BM and a low voltage potential is present on the masking operand M. Otherwise, the node QM_INT is drawn to the low voltage potential by the pull-down network 104, when the high voltage potential is present on the input operands AM, BM each, and/or when the high voltage potential is present on one of the input operands AM, BM and the high voltage potential on the masking operand M.

FIG. 12 shows a logic circuit according to an embodiment of the present invention, which executes an XOR2 combination between two dual-rail input operands AM, AMN, BM, BMN, taking the masking signal M, MN into account. The pull-up network 102 of the logic circuit comprises a series connection of three transistors, with the source terminal of the first transistor being connected to the high voltage potential VDD and the drain terminal of the third transistor to the node QM_INT. The first transistor is controlled by the masking operand MN, the second transistor by the second input operand BM, and the third transistor by the input operand AM. Two further transistors are connected in parallel to the second and third transistors, wherein the first transistor is controlled by the second input operand BM and the second transistor by the input operand AMN. Symmetrical thereto, the pull-up circuit 102 comprises a further transistor circuit connected between the high voltage potential VDD and the second node QM_INT and controlled by the respective inverted input operands. Both transistor circuits comprise connections enabling to jointly use transistors, in order to draw the intermediate nodes QM_INT, QMN_INT to the high voltage potential. For example, there is a connection between the drain terminals of the second transistors of the transistor circuit consisting of three transistors and a connection between the drain terminals of the first transistors of the parallel connection consisting of two transistors.

The pull-down network 104 is formed symmetrically to the pull-up network, with the difference that the source terminals of the transistors, which are connected to the first voltage potential VDD in the pull-up network 102, are connected to the low voltage potential VSS in the pull-down circuit. The intermediate nodes QM_INT, QMN_INT again are connected to the output of the logic circuit via the inverter pair 106$a, b$ and provide the result operands ZM, ZMN.

Thus, the pull-up network is formed to draw the node QM_INT to the high voltage potential, if either the first input operand AM, the second inverted input operand BMN and the inverted masking operand MN, or the inverted first operand AMN, the second operand BM and the inverted masking operand MN, or the inverted first operand AMN, the second inverted operand BMN and the masking operand M, or the first input operand AM, the second input operand BM and the masking operand M lie at the low voltage potential. Otherwise, the intermediate node QM_INT is drawn to the low voltage potential, if the high voltage level is present on the corresponding combination of the transistors mentioned.

Figure 13:
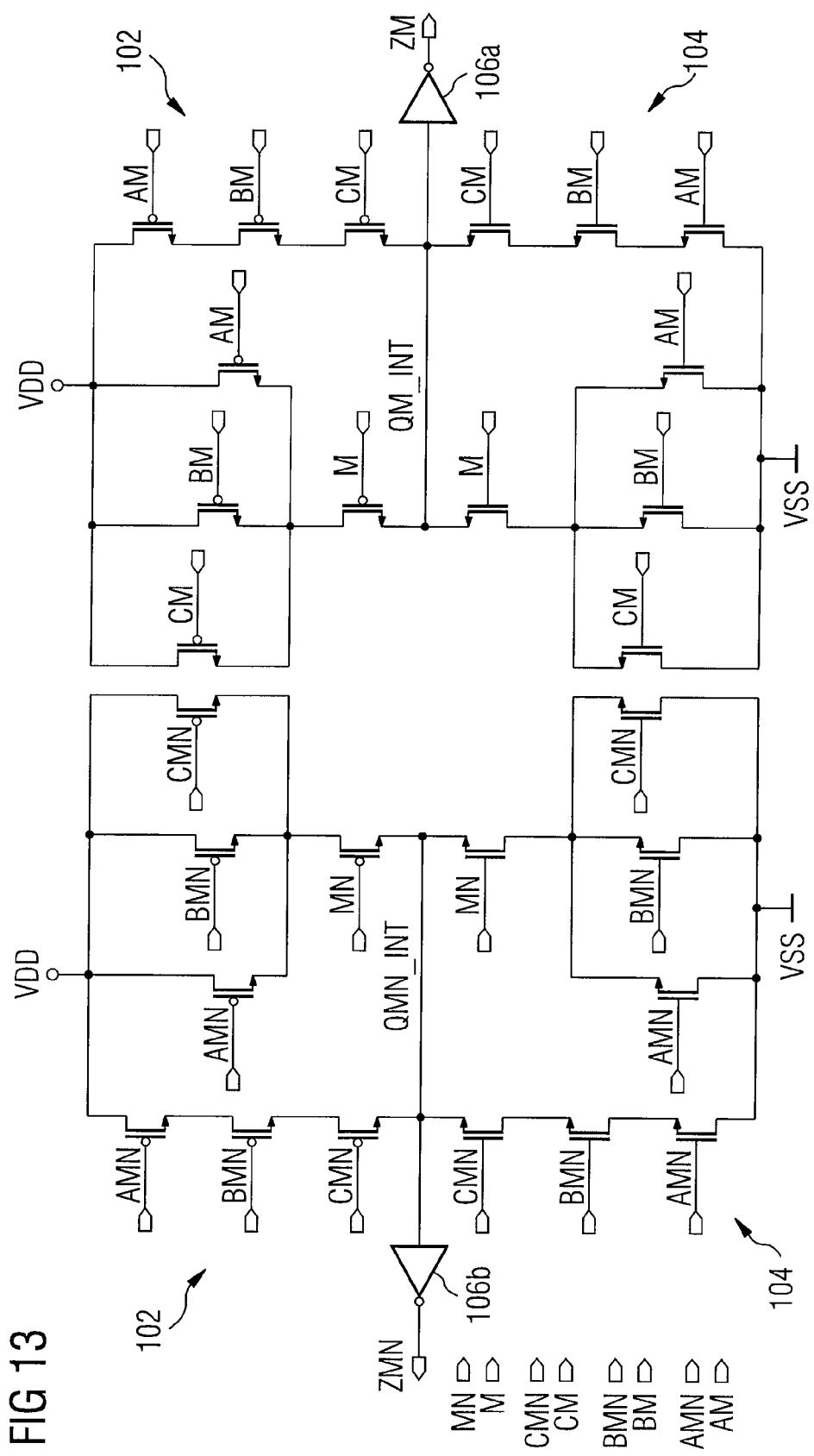

FIG. 13 shows a further embodiment of a logic circuit for the implementation of an AND3 combination among three dual-rail input operands AM, AMN, BM, BMN, CM, CMN, taking the masking operand M, MN into account.

The logic circuit comprises two individual circuits symmetrical to each other, with the first circuit (arranged on the right in FIG. 13) working on the first operands AM, BM, M, ZM of the respective dual-rail input and output operands and the second logic circuit on the operands AMN, BMN, MN, ZMN inverted thereto. Both logic circuits comprise a first potential terminal for the high voltage potential VDD and a second potential terminal for the low voltage potential VSS. Preferably, the corresponding potential terminals of the two circuits are electrically connected.

In the following, the logic circuit working on the non-inverted operands AM, BM, M, ZM will be described in detail. The pull-up network 102 of the logic circuit is connected to the high potential terminal VDD on the input side and to the node QM_INT of the intermediate node on the output side. The pull-up network 102 comprises a series connection of three transistors, which is connected between the first potential terminal VDD and the node QM_INT. The first transistor of this series connection is controlled by the first input operand AM, the second transistor by the input operand BM, and the third transistor by the input operand CM. Furthermore, the pull-up network 102 comprises a parallel connection of three transistors, which are connected to the first voltage terminal VDD with their source terminals and controlled by the first input operand AM, the second input operand BM, and the third input operand CM, respectively. The transistors connected in parallel are connected to the node QM_INT with their drain terminals via a further transistor controlled by the masking operand M.

The pull-down network 104 is constructed symmetrically to the pull-up network 102, with the source terminals of the transistors being connected to the second voltage potential VSS instead of the first voltage potential VDD. The node QM_INT is connected to the inverter 106a, which is formed to provide the output operand ZM, the logic state of which is inverted to the logic state of the node QM_INT.

Thus, the node QM_INT is drawn to the high voltage potential VDD by the pull-up network 102, if a low voltage potential is present on the input operands AM, BM, CM each, and/or if a low voltage potential is present on one of the input operand AM, BM, CM and a low voltage potential on the masking operand M. Otherwise, the node QM_INT is drawn to the low voltage potential by the pull-down network 104, if the high voltage potential is present on the input operands AM, BM, CM each, and/or if the high voltage potential is present on one of the input operands AM, BM, CM and the high voltage potential on the masking operand M.

Figure 14:
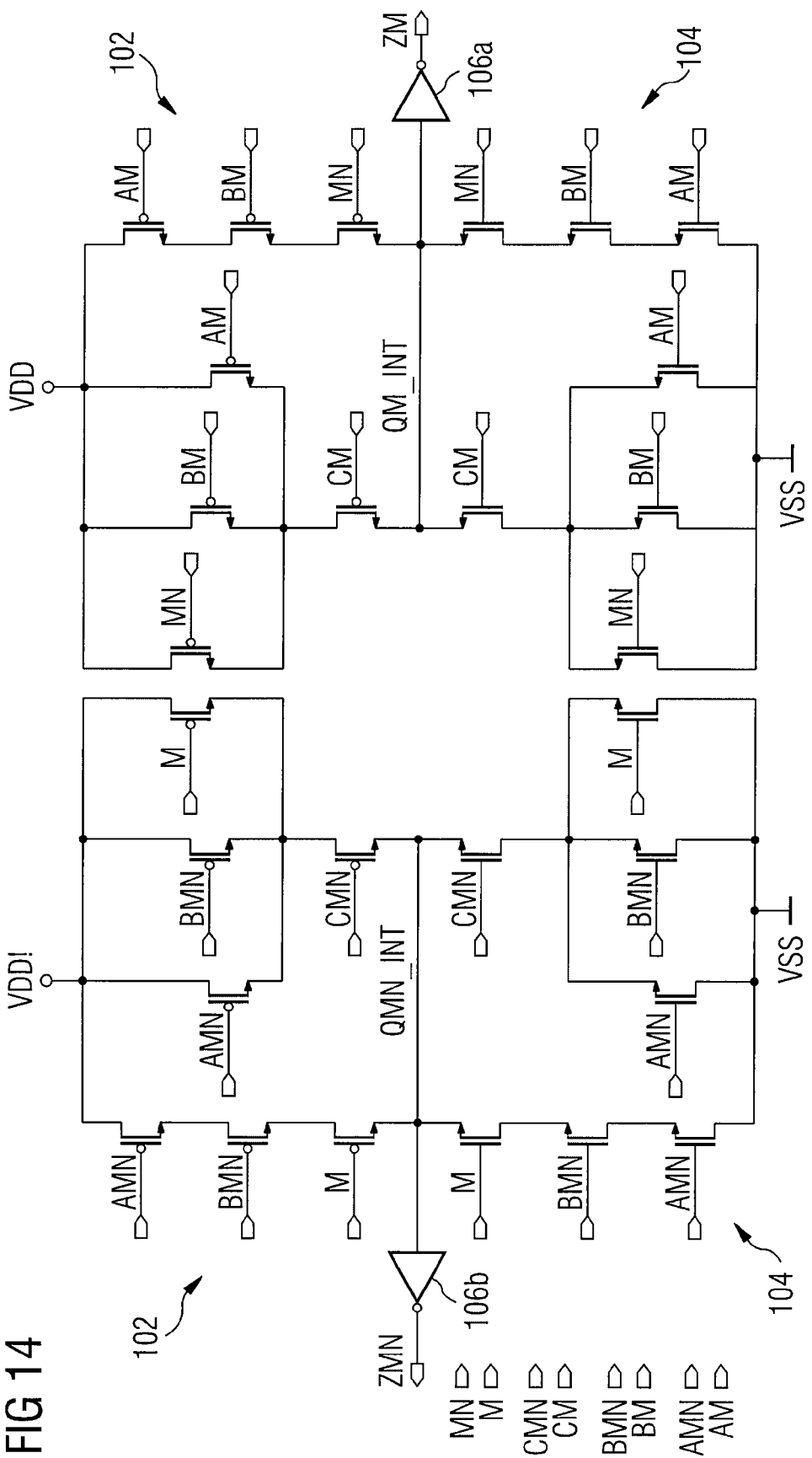

FIG. 14 shows a further embodiment of a logic circuit for implementing an ANDOR21 combination among three dual-rail input operands AM, AMN, BM, BMN, CM, CMN, taking the masking operand M, MN into account. The structural construction of the transistor circuit corresponds to the construction described on the basis of FIGS. 11 and 12. The exact connection of the transistors can be taken from FIG. 14.

The gates shown in FIG. 14 correspond to the gates shown in FIG. 13, wherein the signal terminals for the third input operand CM, CMN and the signal terminals for the masking operand M, MN are exchanged.

Figure 15:
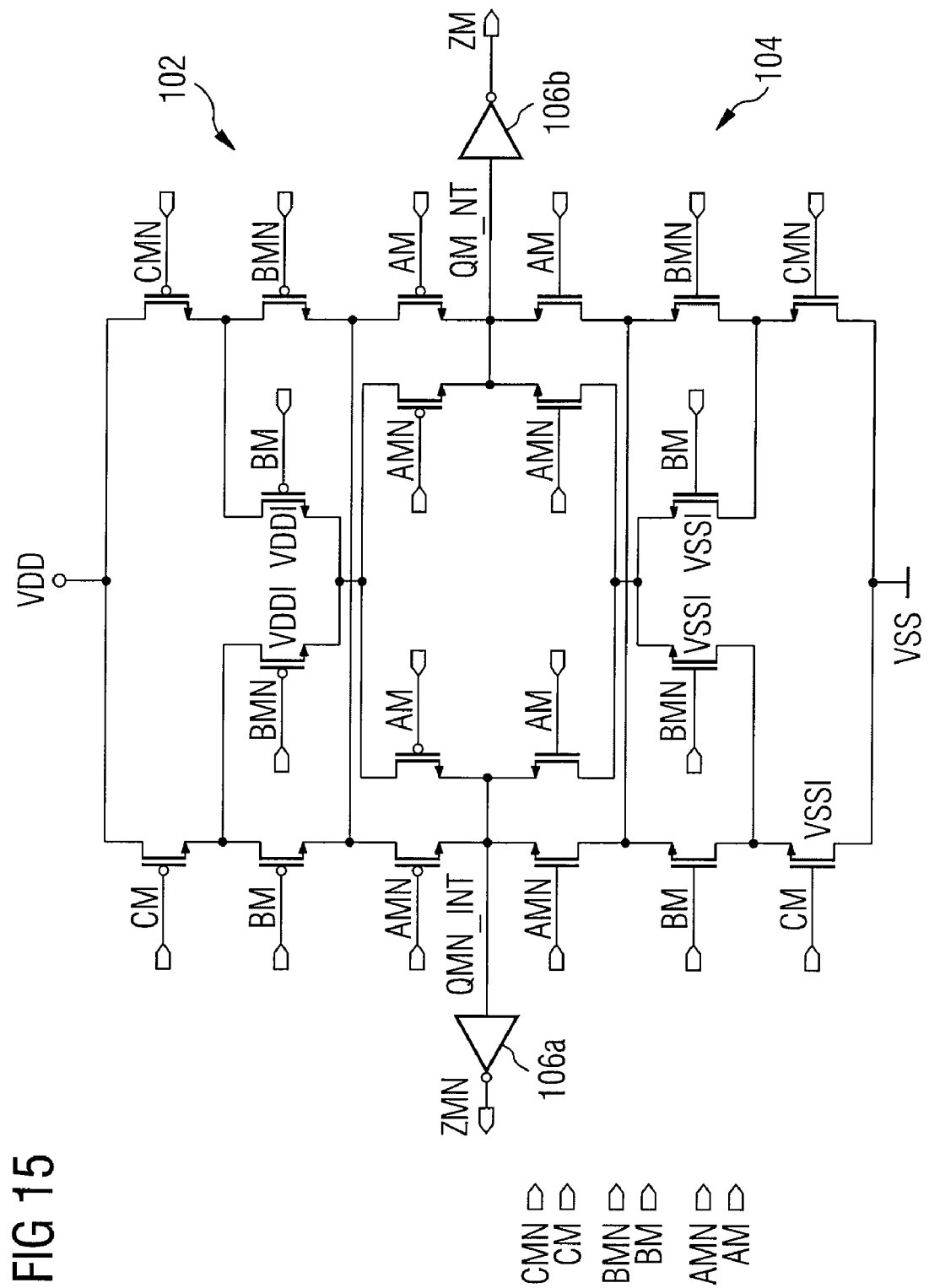

FIG. 15 shows a further embodiment of a logic circuit for implementing an XOR3 combination among three dual-rail input operands AM, AMN, BM, BMN, CM, CMN. The structural construction of the transistor circuit corresponds to the construction described on the basis of FIGS. 11 and 12. The exact connection of the transistors can be taken from FIG. 15.

Different from the foregoing embodiments, the dual-rail masking operand M, MN is not required in the implementation of the XOR3 combination, since the mask is calculated out of the function. This results from the fact that, according to the embodiments described here, an XOR combination of the operands with the masking operand is used for masking.

The gates shown in FIG. 15 correspond to the gates shown in FIG. 12, wherein the signal terminals for the third input operand CM, CMN are replaced by the signal terminal for the masking operand M, MN.

Figure 16:
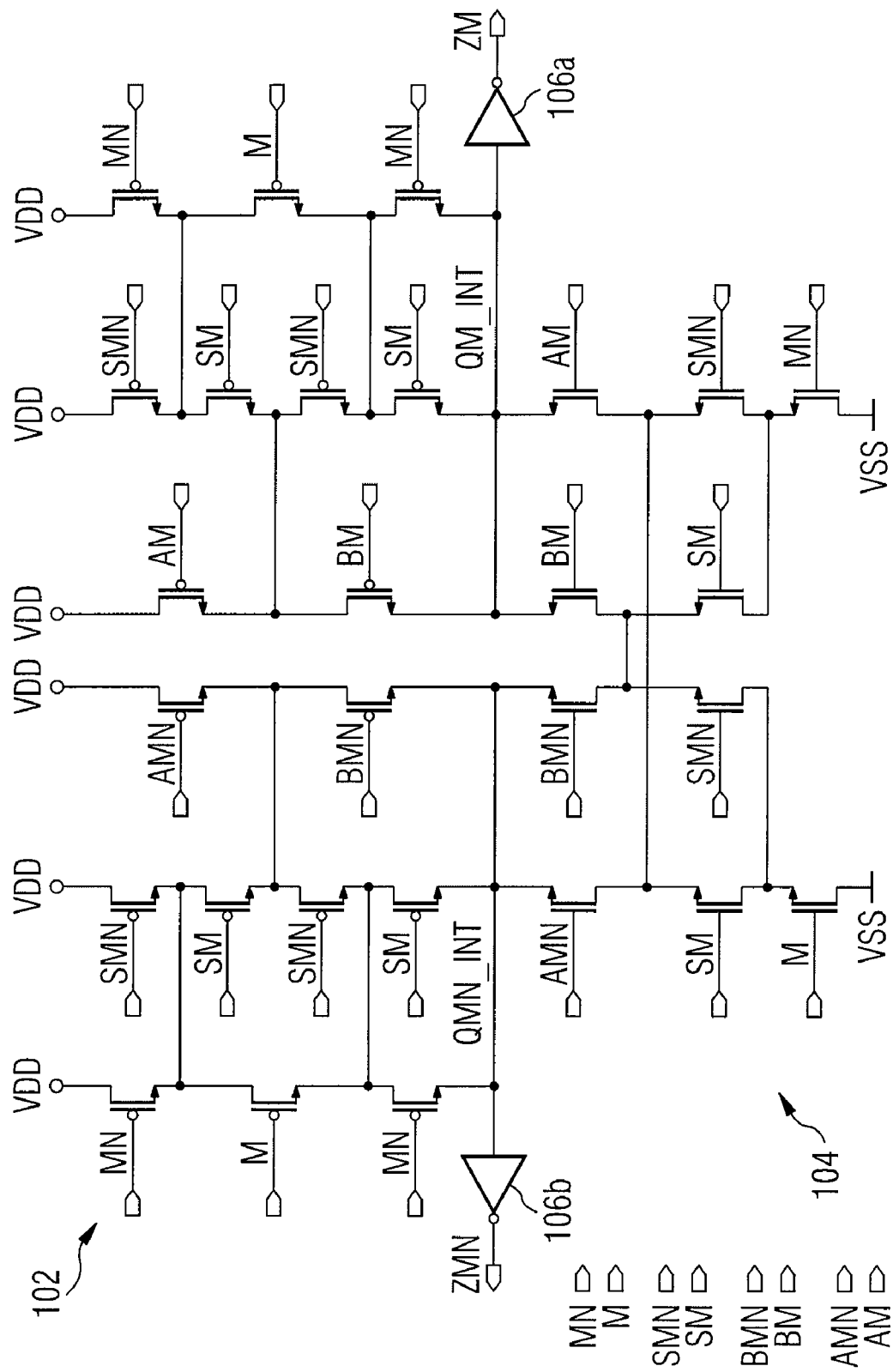

FIG. 16 shows a further embodiment of a logic circuit for implementing a multiplexer combination between two dual-rail input operands AM, AMN, BM, BMN, using a selection operand SM, SMN, taking the masking operand M, MN into account. The structural construction of the transistor circuit corresponds to the construction described on the basis of FIGS. 11 and 12. The exact connection of the transistors can be taken from FIG. 16.

Figure 17:
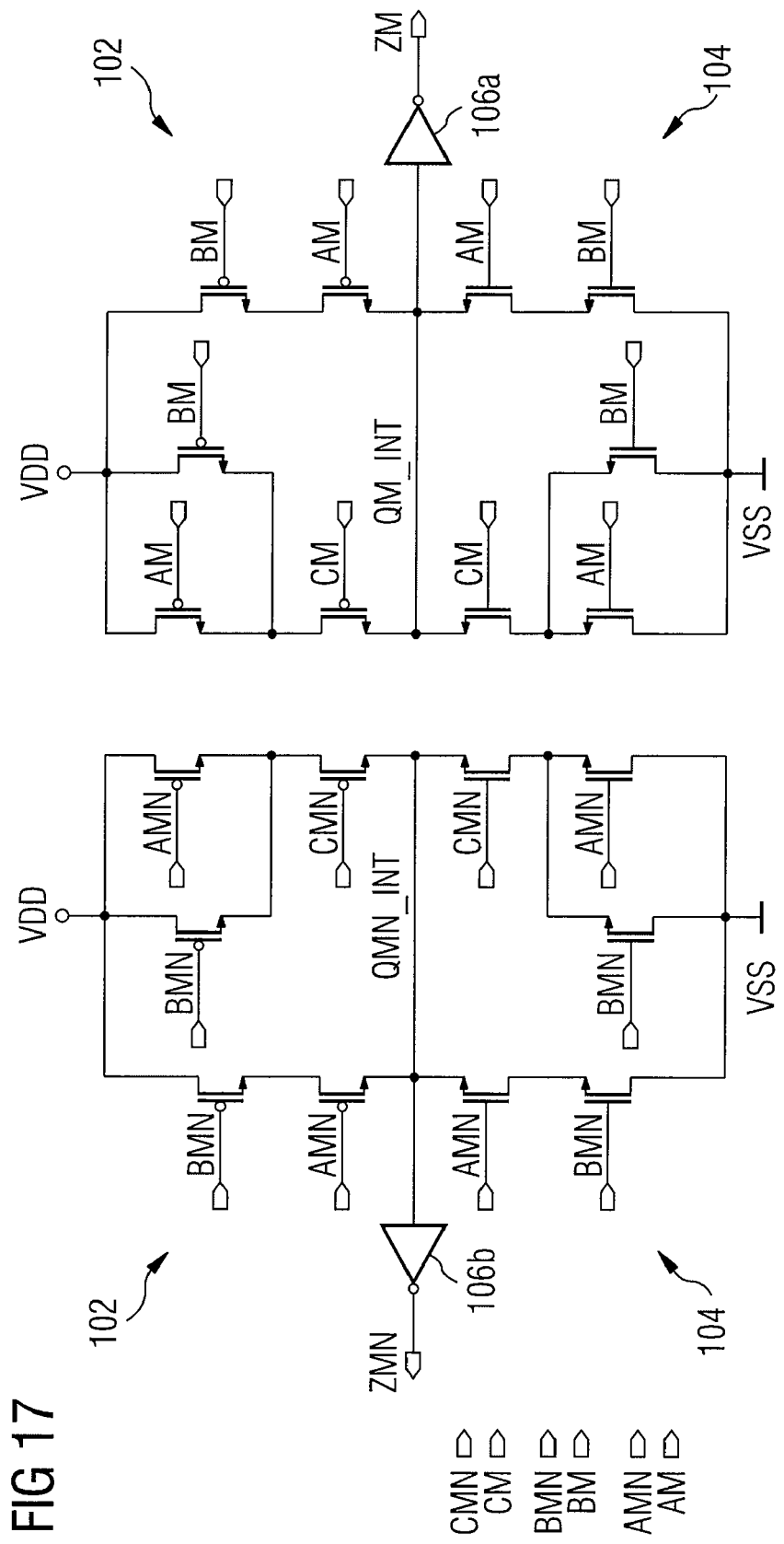
Figures 18, 19A, 19B:
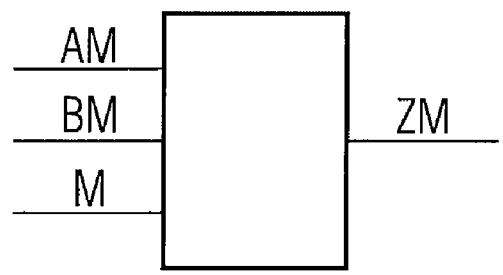
FIG. 18 is a block circuit diagram of a logic cell used for masking according to the prior art.
FIGS. 19a, b are tables of values of a logic combination according to the prior art.

FIG. 17 shows a further embodiment of a logic circuit for implementing a majority function among three dual-rail input operands AM, AMN, BM, BMN, CM, CMN. The structural construction of the transistor circuit corresponds to the construction described on the basis of FIGS. 11 and 12. The exact connection of the transistors can be taken from FIG. 17. Due to the special combination rule, the masking operand is not required and can be guided past the logic circuit.

The gates shown in FIG. 17 correspond to the gates shown in FIG. 11, wherein the signal terminals for the third input operand CM, CMN and the signal terminal for the masking operand M, MN are replaced.

The transistor circuits shown in FIGS. 11-17 are chosen exemplarily and may be replaced by circuits with equal functionality. The inventive approach may be expanded to circuits with four or more inputs for receiving further dual-rail signals. Likewise, the present invention is not limited to the shown transistor logic and transistor technology.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A logic circuit for calculating an encrypted result operand from a first encrypted input operand and a second encrypted input operand according to a combination rule, comprising:
    a first input for receiving the first encrypted input operand;
    a second input for receiving the second encrypted input operand;
    an output for outputting the encrypted result operand;
    wherein each operand comprises a first logic state or a second logic state; and
    at least one first logic stage and at least one second logic stage, wherein the at least one first logic stage is connected between the inputs and an intermediate node, and the at least one second logic stage is connected between the intermediate node and the output, and wherein the logic stages are arranged such that a logic path from one of the inputs of the logic circuit to the output of the logic circuit comprises an even number of logic stages,
    wherein the logic stages are formed to calculate the first or second logic state of the encrypted result operand from the input operands according to the combination rule and to impress the same at the output, and wherein the logic circuit is formed so that the logic state of the encrypted result operand is maintained or changed exactly once, independently of an order of arrival of the encrypted input operands, depending on the combination rule.

2. The logic circuit of claim 1, wherein each of the logic stages is formed to change a logic state of the output of the logic stage from a first logic state to a second logic state, when a transition from the second logic state to the first logic state occurs at one of the inputs of the logic stage, and
    wherein each of the logic stages is formed to change a logic state of the output of the logic stage from the second logic state to the first logic state, when a transition from the first logic state to the second logic state occurs at one of the inputs of the logic stage.

3. The logic circuit of claim 1, wherein the first logic circuit comprises a pull-up network connected between the first potential terminal and the intermediate node, and formed to calculate first logic states from the input operands according to the combination rule and impress the same on the intermediate node; and wherein the second logic circuit comprises a pull-down network connected between a second potential terminal and the intermediate node, and formed to calculate second logic states from the input operands according to the combination rule and impress the same on the intermediate node.

4. The logic circuit of claim 1, wherein the second logic circuit is an inverter.

5. The logic circuit of claim 1, wherein the encrypted input operands comprise a first logic state in a precharge cycle and comprise the first or the second logic state in a calculation cycle, and wherein the logic circuit is formed to hold a first logic value on the output at a transition from the calculation cycle to the precharge cycle when the output already comprises the first logic state, or to impress the first logic state when the output comprises the second logic state.

6. The logic circuit of claim 5, wherein the logic circuit is formed to hold the first logic state on the output at the transition from the precharge cycle to the calculation cycle when the output comprises the first logic state according to the combination rule, or to impress the second logic state when the output comprises the second logic state according to the combination rule in the calculation cycle.

7. The logic circuit of claim 1, wherein the logic stages are each formed in one-stage transistor logic.

8. The logic circuit of claim 1, further comprising an encryption input for receiving an encryption operand,
wherein the encrypted input operands and the encrypted result operand are operands encrypted with the encryption operand, and wherein the combination rule is an XOR combination or NXOR combination.

9. The logic circuit of claim 1, further comprising a third input for receiving a third input operand.

10. The logic circuit of claim 1, wherein the operands are dual-rail operands and the intermediate node is a dual-rail intermediate node.

11. The logic circuit of claim 10, wherein each dual-rail operand consists of a first operand and a second operand, and wherein the first operand and the second operand of a dual-rail operand comprise equal logic states each as a precharge value in the precharge cycle and logic states inverted with respect to each other as a calculation value in the calculation cycle.

12. The logic circuit of claim 11, wherein the logic stages are formed to impress the precharge value at the dual-rail output operand or maintain the logic state of the dual-rail output operand at a transition of one of the dual-rail input operands from the calculation value to the precharge value.

13. The logic circuit of claim 11, wherein the logic stages are formed to maintain the precharge value at the dual-rail output operand at a transition of the dual-rail input operand from the precharge value to the calculation value until the logic state of the dual-rail output operand is defined by the dual-rail input operands that already comprise calculation values according to the calculation rule.

14. The logic circuit of claim 1, wherein the combination rule is an AND, a NAND, an OR, a NOR, an XOR, a NXOR, an ANDOR, an ORAND, a multiplexer, or a majority function.

15. The logic circuit of claim 8, wherein the combination rule is an AND combination of two encrypted dual-rail input operands according to the combination table

| AM | AMN | BM | BMN | M | MN | ZM | ZMN |
|----|-----|----|----|----|----|----|-----|
| 0 | 0 | 0 | 0 | 0 | 0 | 0 | 0 |
| 0 | 0 | 0 | 0 | 0 | 1 | 0 | 0 |
| 0 | 0 | 0 | 0 | 1 | 0 | 0 | 0 |
| 0 | 0 | 0 | 1 | 0 | 0 | 0 | 0 |
| 0 | 0 | 0 | 1 | 0 | 1 | 0 | d1 |
| 0 | 0 | 0 | 1 | 1 | 0 | 0 | 0 |
| 0 | 0 | 1 | 0 | 0 | 0 | 0 | 0 |
| 0 | 0 | 1 | 0 | 0 | 1 | 0 | 0 |
| 0 | 0 | 1 | 0 | 1 | 0 | d4 | 0 |
| 0 | 1 | 0 | 0 | 0 | 0 | 0 | 0 |
| 0 | 1 | 0 | 0 | 0 | 1 | 0 | d2 |
| 0 | 1 | 0 | 0 | 1 | 0 | 0 | 0 |
| 0 | 1 | 0 | 1 | 0 | 0 | 0 | d3 |
| 0 | 1 | 0 | 1 | 0 | 1 | 0 | 1 |
| 0 | 1 | 0 | 1 | 1 | 0 | 0 | 1 |
| 0 | 1 | 1 | 0 | 0 | 0 | 0 | 0 |
| 0 | 1 | 1 | 0 | 0 | 1 | 0 | 1 |
| 0 | 1 | 1 | 0 | 1 | 0 | 1 | 0 |
| 1 | 0 | 0 | 0 | 0 | 0 | 0 | 0 |
| 1 | 0 | 0 | 0 | 0 | 1 | 0 | 0 |
| 1 | 0 | 0 | 0 | 1 | 0 | d5 | 0 |
| 1 | 0 | 0 | 1 | 0 | 0 | 0 | 0 |
| 1 | 0 | 0 | 1 | 0 | 1 | 0 | 1 |
| 1 | 0 | 0 | 1 | 1 | 0 | 1 | 0 |
| 1 | 0 | 1 | 0 | 0 | 0 | d6 | 0 |
| 1 | 0 | 1 | 0 | 0 | 1 | 1 | 0 |
| 1 | 0 | 1 | 0 | 1 | 0 | 1 | 0 | wherein entries designated with "d1", "d2", "d3", "d4", "d5", "d6" comprise a first logic state or a second logic state, and
wherein AM, AMN is the first encrypted input operand, BM, BMN is the second encrypted input operand, M, MN is the encryption operand, and ZM, ZMN is the encrypted result operand.

16. The logic circuit of claim 8, wherein the combination rule is an AND combination of two encrypted dual-rail input operands according to the equations $$ZM = AM \cdot BM + AM \cdot M + BM \cdot M$$

$$ZMN = AMN \cdot BMN + AMN \cdot MN + BMN \cdot MN;$$

wherein, the "·" sign represents an AND combination and the "+" sign an OR combination, and wherein AM, AMN is the first encrypted input operand, BM, BMN is the second encrypted input operand, M, MN is the encryption operand, and ZM, ZMN is the encrypted result operand.

17. The logic circuit of claim 8, wherein the combination rule is an XOR combination of two encrypted dual-rail input operands according to the combination table

| AM | AMN | BM | BMN | M | MN | ZM | ZMN |
|----|-----|----|----|----|----|----|-----|
| 0 | 0 | 0 | 0 | 0 | 0 | 0 | 0 |
| 0 | 0 | 0 | 0 | 0 | 1 | 0 | 0 |
| 0 | 0 | 0 | 0 | 1 | 0 | 0 | 0 |
| 0 | 0 | 0 | 1 | 0 | 0 | 0 | 0 |
| 0 | 0 | 0 | 1 | 0 | 1 | 0 | 0 |
| 0 | 0 | 0 | 1 | 1 | 0 | 0 | 0 |
| 0 | 0 | 1 | 0 | 0 | 0 | 0 | 0 |
| 0 | 0 | 1 | 0 | 0 | 1 | 0 | 0 |
| 0 | 0 | 1 | 0 | 1 | 0 | 0 | 0 |
| 0 | 1 | 0 | 0 | 0 | 0 | 0 | 0 |
| 0 | 1 | 0 | 0 | 0 | 1 | 0 | 0 |
| 0 | 1 | 0 | 0 | 1 | 0 | 0 | 0 |
| 0 | 1 | 0 | 1 | 0 | 0 | 0 | 0 |
| 0 | 1 | 0 | 1 | 0 | 1 | 0 | 1 |
| 0 | 1 | 0 | 1 | 1 | 0 | 1 | 0 |
| 0 | 1 | 1 | 0 | 0 | 0 | 0 | 0 |
| 0 | 1 | 1 | 0 | 0 | 1 | 1 | 0 |

-continued

| AM | AMN | BM | BMN | M | MN | ZM | ZMN |
|----|-----|----|----|---|----|----|-----|
| 0 | 1 | 1 | 0 | 1 | 0 | 0 | 1 |
| 1 | 0 | 0 | 0 | 0 | 0 | 0 | 0 |
| 1 | 0 | 0 | 0 | 0 | 1 | 0 | 0 |
| 1 | 0 | 0 | 0 | 1 | 0 | 0 | 0 |
| 1 | 0 | 0 | 1 | 0 | 0 | 0 | 0 |
| 1 | 0 | 0 | 1 | 0 | 1 | 1 | 0 |
| 1 | 0 | 0 | 1 | 1 | 0 | 0 | 1 |
| 1 | 0 | 1 | 0 | 0 | 0 | 0 | 0 |
| 1 | 0 | 1 | 0 | 0 | 1 | 0 | 1 |
| 1 | 0 | 1 | 0 | 1 | 0 | 1 | 0 | wherein AM, AMN is the first encrypted input operand, BM, BMN is the second encrypted input operand, M, MN is the encryption operand, and ZM, ZMN is the encrypted result operand.

18. The logic circuit of claim 8, wherein the combination rule is an XOR combination of two encrypted dual-rail input operands according to the equations $$ZM = AM \cdot BM \cdot M + AMN \cdot BMN \cdot M + AMN \cdot BM \cdot MN + AM \cdot BMN \cdot MN$$

$$ZMN = AMN \cdot BM \cdot M + AM \cdot BMN \cdot M + AM \cdot BM \cdot MN + AMN \cdot BMN \cdot MN;$$

wherein, the "·" sign represents an AND combination and the "+" sign an OR combination, and wherein AM, AMN is the first encrypted input operand, BM, BMN is the second encrypted input operand, M, MN is the encryption operand, and ZM, ZMN is the encrypted result operand.

19. The logic circuit of claim 9, wherein the combination rule is an XOR combination of three encrypted dual-rail input operands according to the combination table

| AM | AMN | BM | BMN | CM | CMN | M | MN | ZM | ZMN |
|----|-----|----|----|----|-----|---|----|----|-----|
| 0 | 0 | 0 | 0 | 0 | 0 | 0 | 0 | 0 | 0 |
| 0 | 0 | 0 | 0 | 0 | 0 | 0 | 1 | 0 | 0 |
| 0 | 0 | 0 | 0 | 0 | 0 | 1 | 0 | 0 | 0 |
| 0 | 0 | 0 | 0 | 0 | 1 | 0 | 0 | 0 | 0 |
| 0 | 0 | 0 | 0 | 0 | 1 | 0 | 1 | 0 | 0 |
| 0 | 0 | 0 | 0 | 0 | 1 | 1 | 0 | 0 | 0 |
| 0 | 0 | 0 | 0 | 1 | 0 | 0 | 0 | 0 | 0 |
| 0 | 0 | 0 | 0 | 1 | 0 | 0 | 1 | 0 | 0 |
| 0 | 0 | 0 | 0 | 1 | 0 | 1 | 0 | 0 | 0 |
| 0 | 0 | 0 | 1 | 0 | 0 | 0 | 0 | 0 | 0 |
| 0 | 0 | 0 | 1 | 0 | 0 | 0 | 1 | 0 | 0 |
| 0 | 0 | 0 | 1 | 0 | 0 | 1 | 0 | 0 | 0 |
| 0 | 0 | 0 | 1 | 0 | 1 | 0 | 0 | 0 | 0 |
| 0 | 0 | 0 | 1 | 0 | 1 | 0 | 1 | 0 | 0 |
| 0 | 0 | 0 | 1 | 0 | 1 | 1 | 0 | 0 | 0 |
| 0 | 0 | 0 | 1 | 1 | 0 | 0 | 0 | 0 | 0 |
| 0 | 0 | 0 | 1 | 1 | 0 | 0 | 1 | 0 | 0 |
| 0 | 0 | 0 | 1 | 1 | 0 | 1 | 0 | 0 | 0 |
| 0 | 0 | 1 | 0 | 0 | 0 | 0 | 0 | 0 | 0 |
| 0 | 0 | 1 | 0 | 0 | 0 | 0 | 1 | 0 | 0 |
| 0 | 0 | 1 | 0 | 0 | 0 | 1 | 0 | 0 | 0 |
| 0 | 0 | 1 | 0 | 0 | 1 | 0 | 0 | 0 | 0 |
| 0 | 0 | 1 | 0 | 0 | 1 | 0 | 1 | 0 | 0 |
| 0 | 0 | 1 | 0 | 0 | 1 | 1 | 0 | 0 | 0 |
| 0 | 0 | 1 | 0 | 1 | 0 | 0 | 0 | 0 | 0 |
| 0 | 0 | 1 | 0 | 1 | 0 | 0 | 1 | 0 | 0 |
| 0 | 0 | 1 | 0 | 1 | 0 | 1 | 0 | 0 | 0 |
| 0 | 1 | 0 | 0 | 0 | 0 | 0 | 0 | 0 | 0 |
| 0 | 1 | 0 | 0 | 0 | 0 | 0 | 1 | 0 | 0 |
| 0 | 1 | 0 | 0 | 0 | 0 | 1 | 0 | 0 | 0 |
| 0 | 1 | 0 | 0 | 0 | 1 | 0 | 0 | 0 | 0 |
| 0 | 1 | 0 | 0 | 0 | 1 | 0 | 1 | 0 | 0 |
| 0 | 1 | 0 | 0 | 0 | 1 | 1 | 0 | 0 | 0 |

-continued

| AM | AMN | BM | BMN | CM | CMN | M | MN | ZM | ZMN |
|----|-----|----|----|----|-----|---|----|----|-----|
| 0 | 1 | 0 | 0 | 1 | 0 | 0 | 0 | 0 | 0 |
| 0 | 1 | 0 | 0 | 1 | 0 | 0 | 1 | 0 | 0 |
| 0 | 1 | 0 | 0 | 1 | 0 | 1 | 0 | 0 | 0 |
| 0 | 1 | 0 | 1 | 0 | 0 | 0 | 0 | 0 | 0 |
| 0 | 1 | 0 | 1 | 0 | 0 | 0 | 1 | 0 | 0 |
| 0 | 1 | 0 | 1 | 0 | 0 | 1 | 0 | 0 | 0 |
| 0 | 1 | 0 | 1 | 0 | 1 | 0 | 0 | 0 | d1 |
| 0 | 1 | 0 | 1 | 0 | 1 | 0 | 1 | 0 | 1 |
| 0 | 1 | 0 | 1 | 0 | 1 | 1 | 0 | 0 | 1 |
| 0 | 1 | 0 | 1 | 1 | 0 | 0 | 0 | d2 | 0 |
| 0 | 1 | 0 | 1 | 1 | 0 | 0 | 1 | 1 | 0 |
| 0 | 1 | 0 | 1 | 1 | 0 | 1 | 0 | 1 | 0 |
| 0 | 1 | 1 | 0 | 0 | 0 | 0 | 0 | 0 | 0 |
| 0 | 1 | 1 | 0 | 0 | 0 | 0 | 1 | 0 | 0 |
| 0 | 1 | 1 | 0 | 0 | 0 | 1 | 0 | 0 | 0 |
| 0 | 1 | 1 | 0 | 0 | 1 | 0 | 0 | d3 | 0 |
| 0 | 1 | 1 | 0 | 0 | 1 | 0 | 1 | 1 | 0 |
| 0 | 1 | 1 | 0 | 0 | 1 | 1 | 0 | 1 | 0 |
| 0 | 1 | 1 | 0 | 1 | 0 | 0 | 0 | 0 | d4 |
| 0 | 1 | 1 | 0 | 1 | 0 | 0 | 1 | 0 | 1 |
| 0 | 1 | 1 | 0 | 1 | 0 | 1 | 0 | 0 | 1 |
| 1 | 0 | 0 | 0 | 0 | 0 | 0 | 0 | 0 | 0 |
| 1 | 0 | 0 | 0 | 0 | 0 | 0 | 1 | 0 | 0 |
| 1 | 0 | 0 | 0 | 0 | 0 | 1 | 0 | 0 | 0 |
| 1 | 0 | 0 | 0 | 0 | 1 | 0 | 0 | 0 | 0 |
| 1 | 0 | 0 | 0 | 0 | 1 | 0 | 1 | 0 | 0 |
| 1 | 0 | 0 | 0 | 0 | 1 | 1 | 0 | 0 | 0 |
| 1 | 0 | 0 | 0 | 1 | 0 | 0 | 0 | 0 | 0 |
| 1 | 0 | 0 | 0 | 1 | 0 | 0 | 1 | 0 | 0 |
| 1 | 0 | 0 | 0 | 1 | 0 | 1 | 0 | 0 | 0 |
| 1 | 0 | 0 | 1 | 0 | 0 | 0 | 0 | 0 | 0 |
| 1 | 0 | 0 | 1 | 0 | 0 | 0 | 1 | 0 | 0 |
| 1 | 0 | 0 | 1 | 0 | 0 | 1 | 0 | 0 | 0 |
| 1 | 0 | 1 | 0 | 0 | 0 | 0 | 0 | 0 | 0 |
| 1 | 0 | 1 | 0 | 0 | 0 | 0 | 1 | 0 | 0 |
| 1 | 0 | 1 | 0 | 0 | 0 | 1 | 0 | 0 | 0 |
| 1 | 0 | 1 | 0 | 1 | 0 | 0 | 0 | d5 | 0 |
| 1 | 0 | 1 | 0 | 1 | 0 | 0 | 1 | 1 | 0 |
| 1 | 0 | 1 | 0 | 1 | 0 | 1 | 0 | 1 | 0 |
| 1 | 0 | 1 | 1 | 0 | 0 | 0 | 0 | 0 | d6 |
| 1 | 0 | 1 | 1 | 0 | 0 | 0 | 1 | 0 | 1 |
| 1 | 0 | 1 | 1 | 0 | 0 | 1 | 0 | 0 | 1 |
| 1 | 0 | 1 | 0 | 0 | 0 | 0 | 0 | 0 | 0 |
| 1 | 0 | 1 | 0 | 0 | 0 | 0 | 1 | 0 | 0 |
| 1 | 0 | 1 | 0 | 0 | 0 | 1 | 0 | 0 | 0 |
| 1 | 0 | 1 | 0 | 1 | 0 | 0 | 0 | 0 | d7 |
| 1 | 0 | 1 | 0 | 1 | 0 | 0 | 1 | 0 | 1 |
| 1 | 0 | 1 | 0 | 1 | 0 | 1 | 0 | 0 | 1 |
| 1 | 0 | 1 | 1 | 0 | 0 | 0 | 0 | d8 | 0 |
| 1 | 0 | 1 | 1 | 0 | 0 | 0 | 1 | 1 | 0 |
| 1 | 0 | 1 | 1 | 0 | 0 | 1 | 0 | 1 | 0 | wherein entries designated with "d1", "d2", "d3", "d4", "d5", "d6", "d7", "d8" comprise a first logic state or a second logic state, and wherein AM, AMN is the first encrypted input operand, BM, BMN is the second encrypted input operand, CM, CMN is the third input operand, M, MN is the encryption operand, and ZM, ZMN is the encrypted result operand.

20. The logic circuit of claim 9, wherein the combination rule is an XOR combination of three encrypted dual-rail input operands according to the equations $$ZM = AM \cdot BM \cdot CM + AMN \cdot BMN \cdot CM + AMN \cdot BM \cdot CMN + AM \cdot BMN \cdot CMN$$

$$ZMN = AMN \cdot BM \cdot CM + AM \cdot BMN \cdot CM + AM \cdot BM \cdot CMN + AMN \cdot BMN \cdot CMN;$$

wherein, the "·" sign represents an AND combination and the "+" sign an OR combination, and wherein AM, AMN is the first encrypted input operand, BM, BMN is the second encrypted input operand, CM, CMN is the third input operand, and ZM, ZMN is the encrypted result operand.

21. The logic circuit of claim 9, wherein the combination rule is an AND combination of three encrypted dual-rail input operands according to the combination table

| AM | AMN | BM | BMN | CM | CMN | M | MN | ZM | ZMN |
|----|-----|----|----|----|-----|---|----|----|-----|
| 0 | 0 | 0 | 0 | 0 | 0 | 0 | 0 | 0 | 0 |
| 0 | 0 | 0 | 0 | 0 | 0 | 0 | 1 | 0 | 0 |
| 0 | 0 | 0 | 0 | 0 | 0 | 1 | 0 | 0 | 0 |
| 0 | 0 | 0 | 0 | 0 | 1 | 0 | 0 | 0 | 0 |
| 0 | 0 | 0 | 0 | 0 | 1 | 0 | 1 | 0 | d1 |
| 0 | 0 | 0 | 0 | 0 | 1 | 1 | 0 | 0 | 0 |
| 0 | 0 | 0 | 0 | 1 | 0 | 0 | 0 | 0 | 0 |
| 0 | 0 | 0 | 0 | 1 | 0 | 0 | 1 | 0 | 0 |
| 0 | 0 | 0 | 0 | 1 | 0 | 1 | 0 | d2 | 0 |
| 0 | 0 | 0 | 1 | 0 | 0 | 0 | 0 | 0 | 0 |
| 0 | 0 | 0 | 1 | 0 | 0 | 0 | 1 | 0 | d1 |
| 0 | 0 | 0 | 1 | 0 | 0 | 1 | 0 | 0 | 0 |
| 0 | 0 | 0 | 1 | 0 | 1 | 0 | 0 | 0 | 0 |
| 0 | 0 | 0 | 1 | 0 | 1 | 0 | 1 | 0 | d1 |
| 0 | 0 | 0 | 1 | 0 | 1 | 1 | 0 | 0 | 0 |
| 0 | 0 | 0 | 1 | 1 | 0 | 0 | 0 | 0 | 0 |
| 0 | 0 | 0 | 1 | 1 | 0 | 0 | 1 | 0 | d1 |
| 0 | 0 | 0 | 1 | 1 | 0 | 1 | 0 | d2 | 0 |
| 0 | 0 | 1 | 0 | 0 | 0 | 0 | 0 | 0 | 0 |
| 0 | 0 | 1 | 0 | 0 | 0 | 0 | 1 | 0 | 0 |
| 0 | 0 | 1 | 0 | 0 | 0 | 1 | 0 | d2 | 0 |
| 0 | 0 | 1 | 0 | 0 | 1 | 0 | 0 | 0 | 0 |
| 0 | 0 | 1 | 0 | 0 | 1 | 0 | 1 | 0 | d1 |
| 0 | 0 | 1 | 0 | 0 | 1 | 1 | 0 | d2 | 0 |
| 0 | 0 | 1 | 0 | 1 | 0 | 0 | 0 | 0 | 0 |
| 0 | 0 | 1 | 0 | 1 | 0 | 0 | 1 | 0 | 0 |
| 0 | 0 | 1 | 0 | 1 | 0 | 1 | 0 | d2 | 0 |
| 0 | 1 | 0 | 0 | 0 | 0 | 0 | 0 | 0 | 0 |
| 0 | 1 | 0 | 0 | 0 | 0 | 0 | 1 | 0 | d1 |
| 0 | 1 | 0 | 0 | 0 | 0 | 1 | 0 | 0 | 0 |
| 0 | 1 | 0 | 0 | 0 | 1 | 0 | 0 | 0 | 0 |
| 0 | 1 | 0 | 0 | 0 | 1 | 0 | 1 | 0 | d1 |
| 0 | 1 | 0 | 0 | 0 | 1 | 1 | 0 | 0 | 0 |
| 0 | 1 | 0 | 0 | 1 | 0 | 0 | 0 | 0 | 0 |
| 0 | 1 | 0 | 0 | 1 | 0 | 0 | 1 | 0 | d1 |
| 0 | 1 | 0 | 0 | 1 | 0 | 1 | 0 | d2 | 0 |
| 0 | 1 | 0 | 1 | 0 | 0 | 0 | 0 | 0 | 0 |
| 0 | 1 | 0 | 1 | 0 | 0 | 0 | 1 | 0 | d1 |
| 0 | 1 | 0 | 1 | 0 | 0 | 1 | 0 | 0 | 0 |
| 0 | 1 | 0 | 1 | 0 | 1 | 0 | 0 | 0 | d3 |
| 0 | 1 | 0 | 1 | 0 | 1 | 0 | 1 | 0 | 1 |
| 0 | 1 | 0 | 1 | 0 | 1 | 1 | 0 | 0 | 1 |
| 0 | 1 | 0 | 1 | 1 | 0 | 0 | 0 | 0 | 0 |
| 0 | 1 | 0 | 1 | 1 | 0 | 0 | 1 | 0 | 1 |
| 0 | 1 | 0 | 1 | 1 | 0 | 1 | 0 | 1 | 0 |
| 0 | 1 | 1 | 0 | 0 | 0 | 0 | 0 | 0 | 0 |
| 0 | 1 | 1 | 0 | 0 | 0 | 0 | 1 | 0 | d1 |
| 0 | 1 | 1 | 0 | 0 | 0 | 1 | 0 | d2 | 0 |
| 0 | 1 | 1 | 0 | 0 | 1 | 0 | 0 | 0 | 0 |
| 0 | 1 | 1 | 0 | 0 | 1 | 0 | 1 | 0 | 1 |
| 0 | 1 | 1 | 0 | 0 | 1 | 1 | 0 | 1 | 0 |
| 0 | 1 | 1 | 0 | 1 | 0 | 0 | 0 | 0 | 0 |
| 0 | 1 | 1 | 0 | 1 | 0 | 0 | 1 | 0 | 1 |
| 0 | 1 | 1 | 0 | 1 | 0 | 1 | 0 | 1 | 0 |
| 1 | 0 | 0 | 0 | 0 | 0 | 0 | 0 | 0 | 0 |
| 1 | 0 | 0 | 0 | 0 | 0 | 0 | 1 | 0 | 0 |
| 1 | 0 | 0 | 0 | 0 | 0 | 1 | 0 | d2 | 0 |
| 1 | 0 | 0 | 0 | 0 | 1 | 0 | 0 | 0 | 0 |
| 1 | 0 | 0 | 0 | 0 | 1 | 0 | 1 | 0 | d1 |
| 1 | 0 | 0 | 0 | 0 | 1 | 1 | 0 | d2 | 0 |
| 1 | 0 | 0 | 0 | 1 | 0 | 0 | 0 | 0 | 0 |
| 1 | 0 | 0 | 0 | 1 | 0 | 0 | 1 | 0 | 0 |
| 1 | 0 | 0 | 0 | 1 | 0 | 1 | 0 | d2 | 0 |
| 1 | 0 | 0 | 1 | 0 | 0 | 0 | 0 | 0 | 0 |
| 1 | 0 | 0 | 1 | 0 | 0 | 0 | 1 | 0 | d1 |
| 1 | 0 | 0 | 1 | 0 | 0 | 1 | 0 | d2 | 0 |
| 1 | 0 | 0 | 1 | 0 | 1 | 0 | 0 | 0 | 0 |
| 1 | 0 | 0 | 1 | 0 | 1 | 0 | 1 | 0 | 1 |
| 1 | 0 | 0 | 1 | 0 | 1 | 1 | 0 | 1 | 0 |
| 1 | 0 | 0 | 1 | 1 | 0 | 0 | 0 | 0 | 0 |
| 1 | 0 | 0 | 1 | 1 | 0 | 0 | 1 | 0 | 1 |
| 1 | 0 | 0 | 1 | 1 | 0 | 1 | 0 | 1 | 0 |
| 1 | 0 | 1 | 0 | 0 | 0 | 0 | 0 | 0 | 0 |
| 1 | 0 | 1 | 0 | 0 | 0 | 0 | 1 | 0 | 0 |
| 1 | 0 | 1 | 0 | 0 | 0 | 1 | 0 | d2 | 0 |
| 1 | 0 | 1 | 0 | 0 | 1 | 0 | 0 | 0 | 0 |
| 1 | 0 | 1 | 0 | 0 | 1 | 0 | 1 | 0 | 1 |
| 1 | 0 | 1 | 0 | 0 | 1 | 1 | 0 | 1 | 0 |
| 1 | 0 | 1 | 0 | 1 | 0 | 0 | 0 | d4 | 0 |
| 1 | 0 | 1 | 0 | 1 | 0 | 0 | 1 | 1 | 0 |
| 1 | 0 | 1 | 0 | 1 | 0 | 1 | 0 | 1 | 0 | wherein entries designated with "d1", "d2", "d3", "d4" comprise a first logic state or a second logic state, wherein states designated with an equal "d" entry comprise the same logic state, and wherein AM, AMN is the first encrypted input operand, BM, BMN is the second encrypted input operand, CM, CMN is the third input operand, M, MN is the encryption operand, and ZM, ZMN is the encrypted result operand.

22. The logic circuit of claim 9, wherein the combination rule is an AND combination of three encrypted dual-rail input operands according to the equations $$ZM = AM \cdot BM \cdot CM + AM \cdot M + BM \cdot M + CM \cdot M$$

$$ZMN = AMN \cdot BMN \cdot CMN + AMN \cdot MN + BMN \cdot MN + CMN \cdot MN;$$

wherein, the "·" sign represents an AND combination and the "+" sign an OR combination, and wherein AM, AMN is the first encrypted input operand, BM, BMN is the second encrypted input operand, CM, CMN is the third input operand, M, MN is the encryption operand, and ZM, ZMN is the encrypted result operand.

23. The logic circuit of claim 9, wherein the combination rule is a multiplexer combination of two encrypted dual-rail input operands and an encrypted dual-rail selection signal according to the combination table

| AM | AMN | BM | BMN | SM | SMN | M | MN | ZM | ZMN |
|----|-----|----|----|----|-----|---|----|----|-----|
| 0 | 0 | 0 | 0 | 0 | 0 | 0 | 0 | 0 | 0 |
| 0 | 0 | 0 | 0 | 0 | 0 | 0 | 1 | 0 | 0 |
| 0 | 0 | 0 | 0 | 0 | 0 | 1 | 0 | 0 | 0 |
| 0 | 0 | 0 | 0 | 0 | 1 | 0 | 0 | 0 | 0 |
| 0 | 0 | 0 | 0 | 0 | 1 | 0 | 1 | 0 | 0 |
| 0 | 0 | 0 | 0 | 0 | 1 | 1 | 0 | 0 | 0 |
| 0 | 0 | 0 | 0 | 1 | 0 | 0 | 0 | 0 | 0 |
| 0 | 0 | 0 | 0 | 1 | 0 | 0 | 1 | 0 | 0 |
| 0 | 0 | 0 | 0 | 1 | 0 | 1 | 0 | 0 | 0 |
| 0 | 0 | 0 | 1 | 0 | 0 | 0 | 0 | 0 | 0 |
| 0 | 0 | 0 | 1 | 0 | 0 | 0 | 1 | 0 | 0 |
| 0 | 0 | 0 | 1 | 0 | 0 | 1 | 0 | 0 | 0 |
| 0 | 0 | 0 | 1 | 0 | 1 | 0 | 0 | 0 | 0 |
| 0 | 0 | 0 | 1 | 0 | 1 | 0 | 1 | 0 | 0 |
| 0 | 0 | 0 | 1 | 0 | 1 | 1 | 0 | 0 | 0 |
| 0 | 0 | 0 | 1 | 1 | 0 | 0 | 0 | 0 | 0 |
| 0 | 0 | 0 | 1 | 1 | 0 | 0 | 1 | 0 | 0 |
| 0 | 0 | 0 | 1 | 1 | 0 | 1 | 0 | 0 | 0 |
| 0 | 0 | 0 | 1 | 1 | 1 | 0 | 0 | 0 | d3 |
| 0 | 0 | 0 | 1 | 1 | 0 | 0 | 0 | 0 | 0 |
| 0 | 0 | 0 | 1 | 1 | 0 | 0 | 1 | 0 | d4 |
| 0 | 0 | 1 | 0 | 0 | 0 | 0 | 0 | 0 | 0 |
| 0 | 0 | 1 | 0 | 0 | 0 | 0 | 1 | 0 | 0 |
| 0 | 0 | 1 | 0 | 0 | 0 | 1 | 0 | 0 | 0 |
| 0 | 0 | 1 | 0 | 0 | 1 | 0 | 0 | 0 | 0 |
| 0 | 0 | 1 | 0 | 0 | 1 | 0 | 1 | 0 | 0 |
| 0 | 0 | 1 | 0 | 0 | 1 | 1 | 0 | 0 | 0 |
| 0 | 0 | 1 | 0 | 1 | 1 | 0 | 0 | d5 | 0 |
| 0 | 0 | 1 | 0 | 1 | 0 | 0 | 0 | 0 | 0 |
| 0 | 0 | 1 | 0 | 1 | 0 | 0 | 1 | d6 | 0 |
| 0 | 0 | 1 | 0 | 1 | 0 | 1 | 0 | 0 | 0 |
| 0 | 1 | 0 | 0 | 0 | 0 | 0 | 0 | 0 | 0 |
| 0 | 1 | 0 | 0 | 0 | 0 | 0 | 1 | 0 | 0 |
| 0 | 1 | 0 | 0 | 0 | 0 | 1 | 0 | 0 | 0 |

-continued

| AM | AMN | BM | BMN | SM | SMN | M | MN | ZM | ZMN |
|---|---|---|---|---|---|---|---|---|---|
| 0 | 1 | 0 | 0 | 0 | 1 | 0 | 0 | 0 | 0 |
| 0 | 1 | 0 | 0 | 0 | 1 | 0 | 1 | 0 | d7 |
| 0 | 1 | 0 | 0 | 0 | 1 | 1 | 0 | 0 | 0 |
| 0 | 1 | 0 | 0 | 1 | 0 | 0 | 0 | 0 | 0 |
| 0 | 1 | 0 | 0 | 1 | 0 | 0 | 1 | 0 | 0 |
| 0 | 1 | 0 | 0 | 1 | 1 | 0 | 0 | 0 | d8 |
| 0 | 1 | 0 | 1 | 0 | 0 | 0 | 0 | 0 | d1 |
| 0 | 1 | 0 | 1 | 0 | 0 | 0 | 1 | 0 | d1 |
| 0 | 1 | 0 | 1 | 0 | 1 | 0 | 0 | 0 | d1 |
| 0 | 1 | 0 | 1 | 0 | 0 | 0 | 0 | 0 | d1 |
| 0 | 1 | 0 | 1 | 0 | 1 | 0 | 1 | 0 | 1 |
| 0 | 1 | 0 | 1 | 0 | 1 | 1 | 0 | 0 | 1 |
| 0 | 1 | 0 | 1 | 1 | 0 | 0 | 0 | 0 | d1 |
| 0 | 1 | 0 | 1 | 1 | 0 | 0 | 1 | 0 | 1 |
| 0 | 1 | 0 | 1 | 1 | 1 | 0 | 0 | 0 | 1 |
| 0 | 1 | 1 | 0 | 0 | 0 | 0 | 0 | 0 | 0 |
| 0 | 1 | 1 | 0 | 0 | 0 | 0 | 1 | 0 | 0 |
| 0 | 1 | 1 | 0 | 0 | 1 | 0 | 0 | 0 | 0 |
| 0 | 1 | 1 | 0 | 0 | 1 | 1 | 0 | 0 | 0 |
| 0 | 1 | 1 | 0 | 1 | 0 | 0 | 0 | 0 | 1 |
| 0 | 1 | 1 | 0 | 1 | 1 | 0 | 1 | 0 | 0 |
| 0 | 1 | 1 | 1 | 0 | 0 | 0 | 0 | 0 | 0 |
| 0 | 1 | 1 | 1 | 0 | 0 | 1 | 0 | 1 | 0 |
| 0 | 1 | 1 | 1 | 0 | 1 | 0 | 0 | 0 | 1 |
| 1 | 0 | 0 | 0 | 0 | 0 | 0 | 0 | 0 | 0 |
| 1 | 0 | 0 | 0 | 0 | 0 | 1 | 0 | 0 | 0 |
| 1 | 0 | 0 | 0 | 0 | 1 | 0 | 0 | 0 | 0 |
| 1 | 0 | 0 | 0 | 0 | 1 | 1 | 0 | 0 | 0 |
| 1 | 0 | 0 | 0 | 1 | 0 | 0 | 1 | d9 | 0 |
| 1 | 0 | 0 | 0 | 1 | 1 | 0 | 0 | 0 | 0 |
| 1 | 0 | 0 | 1 | 0 | 0 | 0 | 0 | 0 | 0 |
| 1 | 0 | 0 | 1 | 0 | 0 | 1 | 0 | 0 | 0 |
| 1 | 0 | 0 | 1 | 0 | 1 | 0 | d10 | 0 | 0 |
| 1 | 0 | 1 | 0 | 0 | 0 | 0 | 0 | 0 | 0 |
| 1 | 0 | 1 | 0 | 0 | 1 | 0 | 0 | 0 | 0 |
| 1 | 0 | 1 | 0 | 1 | 0 | 0 | 0 | 0 | 0 |
| 1 | 0 | 1 | 0 | 1 | 0 | 0 | 0 | 0 | 0 |
| 1 | 0 | 1 | 0 | 1 | 0 | 1 | 1 | 0 | 0 |
| 1 | 0 | 1 | 0 | 1 | 1 | 0 | 0 | 1 | 1 |
| 1 | 0 | 1 | 1 | 0 | 0 | 0 | 0 | 0 | 0 |
| 1 | 0 | 1 | 1 | 0 | 0 | 1 | 0 | 0 | 1 |
| 1 | 0 | 1 | 1 | 0 | 1 | 0 | 1 | 0 | 0 |
| 1 | 0 | 1 | 0 | 0 | 0 | 0 | 0 | d2 | 0 |
| 1 | 0 | 1 | 0 | 0 | 0 | 0 | 1 | d2 | 0 |
| 1 | 0 | 1 | 0 | 0 | 1 | 0 | 0 | d2 | 0 |
| 1 | 0 | 1 | 0 | 0 | 1 | 0 | 0 | d2 | 0 |
| 1 | 0 | 1 | 0 | 0 | 1 | 0 | 1 | 1 | 0 |
| 1 | 0 | 1 | 0 | 0 | 1 | 1 | 0 | 1 | 0 |
| 1 | 0 | 1 | 0 | 1 | 0 | 0 | 0 | d2 | 0 |
| 1 | 0 | 1 | 0 | 1 | 0 | 0 | 1 | 1 | 0 |
| 1 | 0 | 1 | 0 | 1 | 0 | 1 | 0 | 1 | 0 | wherein entries designated with "d1", "d2", "d3", "d4", "d5", "d6", "d7", "d8", "d9", "d10" comprise a first logic state or a second logic state, wherein states designated with an equal "d" entry comprise the same logic state, and wherein AM, AMN is the first encrypted input operand, BM, BMN is the second encrypted input operand, SM, SMN is the encrypted dual-rail selection signal, M, MN is the encryption operand, and ZM, ZMN is the encrypted result operand.

24. The logic circuit of claim 9, wherein the combination rule is a multiplexer combination of two encrypted dual-rail input operands and an encrypted dual-rail selection signal according to the equation $$ZM = AM \cdot SMN \cdot MN + AM \cdot SM \cdot M + BM \cdot SMN \cdot M + BM \cdot SM \cdot MN$$

$$ZMN = AMN \cdot SMN \cdot MN + AMN \cdot SM \cdot M + BMN \cdot SMN \cdot M + BMN \cdot SM \cdot MN;$$

wherein, the "·" sign represents an AND combination and the "+" sign an OR combination, and wherein AM, AMN is the first encrypted input operand, BM, BMN is the second encrypted input operand, SM, SMN is the encrypted dual-rail selection signal, M, MN is the encryption operand, and ZM, ZMN is the encrypted result operand.

25. The logic circuit of claim 9, wherein the combination rule is a majority combination of three encrypted dual-rail input operands according to the combination table

| AM | AMN | BM | BMN | CM | CMN | M | MN | ZM | ZMN |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 1 | 0 | 0 |
| 0 | 0 | 0 | 0 | 0 | 0 | 1 | 0 | 0 | 0 |
| 0 | 0 | 0 | 0 | 0 | 1 | 0 | 0 | 0 | 0 |
| 0 | 0 | 0 | 0 | 0 | 1 | 0 | 1 | 0 | 0 |
| 0 | 0 | 0 | 0 | 0 | 1 | 1 | 0 | 0 | 0 |
| 0 | 0 | 0 | 0 | 1 | 0 | 0 | 0 | 0 | 0 |
| 0 | 0 | 0 | 0 | 1 | 0 | 0 | 1 | 0 | 0 |
| 0 | 0 | 0 | 0 | 1 | 1 | 0 | 0 | 0 | 0 |
| 0 | 0 | 0 | 1 | 0 | 0 | 0 | 0 | 0 | 0 |
| 0 | 0 | 0 | 1 | 0 | 0 | 0 | 1 | 0 | 0 |
| 0 | 0 | 0 | 1 | 0 | 0 | 1 | 0 | 0 | 0 |
| 0 | 0 | 0 | 1 | 0 | 1 | 0 | 0 | 0 | d1 |
| 0 | 0 | 0 | 1 | 0 | 1 | 0 | 1 | 0 | d1 |
| 0 | 0 | 0 | 1 | 0 | 1 | 1 | 0 | 0 | d1 |
| 0 | 0 | 0 | 1 | 1 | 0 | 0 | 0 | 0 | 0 |
| 0 | 0 | 0 | 1 | 1 | 0 | 0 | 1 | 0 | 0 |
| 0 | 0 | 0 | 1 | 1 | 0 | 1 | 0 | 0 | 0 |
| 0 | 0 | 1 | 0 | 0 | 0 | 0 | 0 | 0 | 0 |
| 0 | 0 | 1 | 0 | 0 | 0 | 0 | 1 | 0 | 0 |
| 0 | 0 | 1 | 0 | 0 | 0 | 1 | 0 | 0 | 0 |
| 0 | 0 | 1 | 0 | 0 | 1 | 0 | 0 | 0 | 0 |
| 0 | 0 | 1 | 0 | 0 | 1 | 0 | 1 | 0 | 0 |
| 0 | 0 | 1 | 0 | 0 | 1 | 1 | 0 | 0 | 0 |
| 0 | 0 | 1 | 0 | 1 | 0 | 0 | 0 | d2 | 0 |
| 0 | 0 | 1 | 0 | 1 | 0 | 0 | 1 | d2 | 0 |
| 0 | 0 | 1 | 0 | 1 | 0 | 1 | 0 | d2 | 0 |
| 0 | 1 | 0 | 0 | 0 | 0 | 0 | 0 | 0 | 0 |
| 0 | 1 | 0 | 0 | 0 | 0 | 0 | 1 | 0 | 0 |
| 0 | 1 | 0 | 0 | 0 | 0 | 1 | 0 | 0 | 0 |
| 0 | 1 | 0 | 0 | 0 | 1 | 0 | 0 | 0 | d1 |
| 0 | 1 | 0 | 0 | 0 | 1 | 0 | 1 | 0 | d1 |
| 0 | 1 | 0 | 0 | 0 | 1 | 1 | 0 | 0 | d1 |
| 0 | 1 | 0 | 0 | 1 | 0 | 0 | 0 | 0 | 0 |
| 0 | 1 | 0 | 0 | 1 | 0 | 0 | 1 | 0 | 0 |
| 0 | 1 | 0 | 0 | 1 | 0 | 1 | 0 | 0 | 0 |
| 0 | 1 | 0 | 1 | 0 | 0 | 0 | 0 | 0 | d1 |
| 0 | 1 | 0 | 1 | 0 | 0 | 0 | 1 | 0 | d1 |
| 0 | 1 | 0 | 1 | 0 | 0 | 1 | 0 | 0 | d1 |
| 0 | 1 | 0 | 1 | 0 | 1 | 0 | 0 | 0 | 1 |
| 0 | 1 | 0 | 1 | 0 | 1 | 0 | 1 | 0 | 1 |
| 0 | 1 | 0 | 1 | 1 | 0 | 0 | 0 | 0 | d1 |
| 0 | 1 | 0 | 1 | 1 | 0 | 0 | 1 | 0 | 1 |
| 0 | 1 | 0 | 1 | 1 | 0 | 1 | 0 | 0 | 1 |
| 0 | 1 | 1 | 0 | 0 | 0 | 0 | 0 | 0 | 0 |
| 0 | 1 | 1 | 0 | 0 | 0 | 0 | 1 | 0 | 0 |
| 0 | 1 | 1 | 0 | 0 | 0 | 1 | 0 | 0 | 0 |
| 0 | 1 | 1 | 0 | 0 | 1 | 0 | 0 | 0 | d1 |
| 0 | 1 | 1 | 0 | 0 | 1 | 0 | 1 | 0 | 1 |
| 0 | 1 | 1 | 0 | 0 | 1 | 1 | 0 | 0 | 1 |
| 0 | 1 | 1 | 0 | 1 | 0 | 0 | 0 | d2 | 0 |
| 0 | 1 | 1 | 0 | 1 | 0 | 0 | 1 | 1 | 0 |
| 0 | 1 | 1 | 0 | 1 | 0 | 1 | 0 | 1 | 0 |
| 1 | 0 | 0 | 0 | 0 | 0 | 0 | 0 | 0 | 0 |
| 1 | 0 | 0 | 0 | 0 | 0 | 0 | 1 | 0 | 0 |
| 1 | 0 | 0 | 0 | 0 | 0 | 1 | 0 | 0 | 0 |
| 1 | 0 | 0 | 0 | 0 | 1 | 0 | 0 | 0 | 0 |
| 1 | 0 | 0 | 0 | 0 | 1 | 0 | 1 | 0 | 0 |
| 1 | 0 | 0 | 0 | 0 | 1 | 1 | 0 | 0 | 0 |
| 1 | 0 | 0 | 0 | 1 | 0 | 0 | 0 | d2 | 0 |
| 1 | 0 | 0 | 0 | 1 | 0 | 0 | 1 | d2 | 0 |
| 1 | 0 | 0 | 0 | 1 | 0 | 1 | 0 | d2 | 0 |
| 1 | 0 | 0 | 1 | 0 | 0 | 0 | 0 | 0 | 0 |
| 1 | 0 | 0 | 1 | 0 | 0 | 0 | 1 | 0 | 0 |
| 1 | 0 | 0 | 1 | 0 | 0 | 1 | 0 | 0 | 0 |
| 1 | 0 | 0 | 1 | 0 | 1 | 0 | 0 | 0 | d1 |

-continued

| AM | AMN | BM | BMN | CM | CMN | M | MN | ZM | ZMN |
|---|---|---|---|---|---|---|---|---|---|
| 1 | 0 | 0 | 1 | 0 | 1 | 0 | 1 | 0 | 1 |
| 1 | 0 | 0 | 1 | 0 | 1 | 1 | 0 | 0 | 1 |
| 1 | 0 | 0 | 1 | 1 | 0 | 0 | 0 | d2 | 0 |
| 1 | 0 | 0 | 1 | 1 | 0 | 0 | 1 | 1 | 0 |
| 1 | 0 | 0 | 1 | 1 | 0 | 1 | 0 | 1 | 0 |
| 1 | 0 | 1 | 0 | 0 | 0 | 0 | 0 | d2 | 0 |
| 1 | 0 | 1 | 0 | 0 | 0 | 0 | 1 | d2 | 0 |
| 1 | 0 | 1 | 0 | 0 | 0 | 1 | 0 | d2 | 0 |
| 1 | 0 | 1 | 0 | 0 | 1 | 0 | 0 | d2 | 0 |
| 1 | 0 | 1 | 0 | 0 | 1 | 0 | 1 | 1 | 0 |
| 1 | 0 | 1 | 0 | 0 | 1 | 1 | 0 | 1 | 0 |
| 1 | 0 | 1 | 0 | 1 | 0 | 0 | 0 | d2 | 0 |
| 1 | 0 | 1 | 0 | 1 | 0 | 0 | 1 | 1 | 0 |
| 1 | 0 | 1 | 0 | 1 | 0 | 1 | 0 | 1 | 0 | wherein entries designated with "d1", "d2" comprise a first logic state or a second logic state, wherein states designated with an equal "d" entry comprise the same logic state, and wherein AM, AMN is the first encrypted input operand, BM, BMN is the second encrypted input operand, CM, CMN is the third input operand, M, MN is the encryption operand, and ZM, ZMN is the encrypted result operand.

26. The logic circuit of claim 9, wherein the combination rule is a majority combination of three encrypted dual-rail input operands according to the equations $$ZM = AM \cdot BM + AM \cdot CM + CM \cdot BM$$

$$ZMN = AMN \cdot BMN + AMN \cdot CMN + CMN \cdot BMN;$$

wherein, the "·" sign represents an AND combination and the "+" sign an OR combination, and wherein AM, AMN is the first encrypted input operand, BM, BMN is the second encrypted input operand, CM, CMN is the third input operand, and ZM, ZMN is the encrypted result operand.

27. The logic circuit of claim 9, wherein the combination rule is an ANDOR combination of three encrypted dual-rail input operands according to the combination table

| AM | AMN | BM | BMN | CM | CMN | M | MN | ZM | ZMN |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 1 | 0 | 0 |
| 0 | 0 | 0 | 0 | 0 | 1 | 0 | 0 | 0 | 0 |
| 0 | 0 | 0 | 0 | 0 | 1 | 0 | 1 | 0 | 0 |
| 0 | 0 | 0 | 0 | 0 | 1 | 1 | 0 | 0 | d1 |
| 0 | 0 | 0 | 0 | 1 | 0 | 0 | 0 | 0 | 0 |
| 0 | 0 | 0 | 0 | 1 | 0 | 0 | 1 | d2 | 0 |
| 0 | 0 | 0 | 0 | 1 | 0 | 1 | 0 | 0 | 0 |
| 0 | 0 | 0 | 1 | 0 | 0 | 0 | 0 | 0 | 0 |
| 0 | 0 | 0 | 1 | 0 | 0 | 0 | 1 | 0 | 0 |
| 0 | 0 | 0 | 1 | 0 | 1 | 0 | 0 | 0 | d1 |
| 0 | 0 | 0 | 1 | 0 | 1 | 0 | 1 | 0 | d1 |
| 0 | 0 | 0 | 1 | 0 | 1 | 1 | 0 | 0 | d1 |
| 0 | 0 | 0 | 1 | 1 | 0 | 0 | 0 | 0 | 0 |
| 0 | 0 | 0 | 1 | 1 | 0 | 0 | 1 | d2 | 0 |
| 0 | 0 | 0 | 1 | 1 | 0 | 1 | 0 | 0 | 0 |
| 0 | 0 | 1 | 0 | 0 | 0 | 0 | 0 | 0 | 0 |
| 0 | 0 | 1 | 0 | 0 | 0 | 0 | 1 | 0 | 0 |
| 0 | 0 | 1 | 0 | 0 | 1 | 0 | 0 | 0 | 0 |
| 0 | 0 | 1 | 0 | 0 | 1 | 0 | 1 | 0 | d1 |
| 0 | 0 | 1 | 0 | 1 | 0 | 0 | 0 | d2 | 0 |
| 0 | 0 | 1 | 0 | 1 | 0 | 0 | 1 | d2 | 0 |
| 0 | 0 | 1 | 0 | 1 | 0 | 1 | 0 | d2 | 0 |
| 0 | 1 | 0 | 0 | 0 | 0 | 0 | 0 | 0 | 0 |
| 0 | 1 | 0 | 0 | 0 | 0 | 0 | 1 | 0 | 0 |
| 0 | 1 | 0 | 0 | 0 | 0 | 1 | 0 | 0 | 0 |
| 0 | 1 | 0 | 0 | 0 | 1 | 0 | 0 | 0 | d1 |
| 0 | 1 | 0 | 0 | 0 | 1 | 0 | 1 | 0 | d1 |
| 0 | 1 | 0 | 0 | 0 | 1 | 1 | 0 | 0 | d1 |
| 0 | 1 | 0 | 0 | 1 | 0 | 0 | 0 | 0 | 0 |
| 0 | 1 | 0 | 0 | 1 | 0 | 0 | 1 | d2 | 0 |
| 0 | 1 | 0 | 0 | 1 | 0 | 1 | 0 | 0 | 0 |
| 0 | 1 | 0 | 1 | 0 | 0 | 0 | 0 | 0 | 0 |
| 0 | 1 | 0 | 1 | 0 | 0 | 0 | 1 | 0 | 0 |
| 0 | 1 | 0 | 1 | 0 | 1 | 0 | 0 | 0 | d3 |
| 0 | 1 | 0 | 1 | 0 | 1 | 0 | 0 | 0 | d1 |
| 0 | 1 | 0 | 1 | 0 | 1 | 0 | 1 | 0 | 1 |
| 0 | 1 | 0 | 1 | 0 | 1 | 1 | 0 | 0 | 1 |
| 0 | 1 | 0 | 1 | 1 | 0 | 0 | 0 | 0 | 0 |
| 0 | 1 | 0 | 1 | 1 | 0 | 0 | 1 | 1 | 0 |
| 0 | 1 | 0 | 1 | 1 | 0 | 1 | 0 | 0 | 1 |
| 0 | 1 | 1 | 0 | 0 | 0 | 0 | 0 | 0 | 0 |
| 0 | 1 | 1 | 0 | 0 | 0 | 0 | 1 | 0 | 0 |
| 0 | 1 | 1 | 0 | 0 | 0 | 1 | 0 | 0 | 0 |
| 0 | 1 | 1 | 0 | 0 | 1 | 0 | 0 | 0 | d1 |
| 0 | 1 | 1 | 0 | 0 | 1 | 0 | 1 | 0 | 1 |
| 0 | 1 | 1 | 0 | 0 | 1 | 1 | 0 | 0 | 1 |
| 0 | 1 | 1 | 0 | 1 | 0 | 0 | 0 | d2 | 0 |
| 0 | 1 | 1 | 0 | 1 | 0 | 0 | 1 | 1 | 0 |
| 0 | 1 | 1 | 0 | 1 | 0 | 1 | 0 | 1 | 0 |
| 1 | 0 | 0 | 0 | 0 | 0 | 0 | 0 | 0 | 0 |
| 1 | 0 | 0 | 0 | 0 | 0 | 1 | 0 | 0 | 0 |
| 1 | 0 | 0 | 0 | 0 | 1 | 0 | 0 | 0 | 0 |
| 1 | 0 | 0 | 0 | 1 | 0 | 0 | 0 | 0 | 0 |
| 1 | 0 | 0 | 0 | 1 | 0 | 1 | 0 | 0 | 0 |
| 1 | 0 | 0 | 0 | 1 | 1 | 0 | 0 | 0 | d1 |
| 1 | 0 | 0 | 1 | 0 | 0 | 0 | 0 | d2 | 0 |
| 1 | 0 | 0 | 1 | 0 | 0 | 0 | 1 | d2 | 0 |
| 1 | 0 | 0 | 1 | 0 | 1 | 0 | 0 | d2 | 0 |
| 1 | 0 | 1 | 0 | 0 | 0 | 0 | 0 | 0 | 0 |
| 1 | 0 | 1 | 0 | 0 | 0 | 0 | 1 | 0 | 0 |
| 1 | 0 | 1 | 0 | 0 | 1 | 0 | 0 | 0 | 0 |
| 1 | 0 | 1 | 0 | 0 | 1 | 1 | 0 | 0 | d1 |
| 1 | 0 | 1 | 0 | 1 | 0 | 0 | 0 | 0 | 1 |
| 1 | 0 | 1 | 0 | 1 | 1 | 0 | 0 | 0 | 1 |
| 1 | 0 | 1 | 1 | 0 | 0 | 0 | 0 | d2 | 0 |
| 1 | 0 | 1 | 1 | 0 | 0 | 0 | 1 | 1 | 0 |
| 1 | 0 | 1 | 1 | 0 | 1 | 0 | 0 | 1 | 0 |
| 1 | 1 | 0 | 0 | 0 | 0 | 0 | 0 | 0 | 0 |
| 1 | 1 | 0 | 0 | 0 | 0 | 0 | 1 | d4 | 0 |
| 1 | 1 | 0 | 0 | 0 | 1 | 0 | 0 | 0 | 0 |
| 1 | 1 | 0 | 0 | 1 | 0 | 0 | 0 | 0 | 0 |
| 1 | 1 | 0 | 0 | 1 | 0 | 0 | 1 | 1 | 0 |
| 1 | 1 | 0 | 0 | 1 | 1 | 0 | 0 | 0 | 1 |
| 1 | 1 | 0 | 1 | 0 | 0 | 0 | 0 | d2 | 0 |
| 1 | 1 | 0 | 1 | 0 | 0 | 0 | 1 | 1 | 0 |
| 1 | 1 | 0 | 1 | 0 | 1 | 0 | 0 | 1 | 0 | wherein entries designated with "d1", "d2", "d3", "d4" comprise a first logic state or a second logic state, wherein states designated with an equal "d" entry comprise the same logic state, and wherein AM, AMN is the first encrypted input operand, BM, BMN is the second encrypted input operand, CM, CMN is the third input operand, M, MN is the encryption operand, and ZM, ZMN is the encrypted result operand.

28. The logic circuit of claim 9, wherein the combination rule is an ANDOR combination of three encrypted dual-rail input operands according to the equations $$ZM = CM \cdot MN + AM \cdot BM \cdot MN + AM \cdot CM + BM \cdot CM$$

$$ZMN = CMN \cdot M + AMN \cdot BMN \cdot M + AMN \cdot CMN + BMN \cdot CMN;$$

wherein, the "·" sign represents an AND combination and the "+" sign an OR combination, and wherein AM, AMN is the first encrypted input operand, BM, BMN is the second encrypted input operand, CM, CMN is the third input operand, M, MN is the encryption operand, and ZM, ZMN is the encrypted result operand.

29. A method of calculating an encrypted dual-rail result operand from a first encrypted dual-rail input operand and a second encrypted dual-rail input operand according to a combination rule, comprising:

receiving the first encrypted input operand at a first input of a dual-rail logic circuit;

receiving the second encrypted input operand at a second input of the dual-rail logic circuit;

wherein each operand comprises a first logic state or a second logic state; and calculating, by the dual-rail logic circuit, the first or second logic state of the encrypted result operand from the input operands according to the combination rule, and impressing the first or second logic state of the encrypted result operand at an output of the dual-rail logic circuit, wherein the logic state of the encrypted result operand at the output is maintained or changed exactly once, independently of an order of arrival of the encrypted input operands at the inputs, depending on the combination rule, wherein the dual-rail logic circuit comprises at least one first logic stage and at least one second logic stage, wherein the at least one first logic stage is connected between the inputs and an intermediate node, and the at least one second logic stage is connected between the intermediate node and the output, and wherein the logic stages are arranged such that a logic path from one of the inputs of the dual-rail logic circuit to the output of the dual-rail logic circuit comprises an even number of logic stages.

30. A logic circuit for calculating an encrypted result operand from a first encrypted input operand and a second encrypted input operand according to a combination rule, comprising:

a first input for receiving the first encrypted input operand;

a second input for receiving the second encrypted input operand;

an output for outputting the encrypted result operand;

wherein each operand comprises a first logic state or a second logic state; and at least one first logic stage means and at least one second logic stage means for calculating the first or second logic state of the encrypted result operand from the input operands according to the combination rule and for impressing the same at the output, wherein the logic circuit is formed so that the logic state of the encrypted result operand is maintained or changed exactly once, independently of an order of arrival of the encrypted input operands, depending on the combination rule, and wherein the at least one first logic stage means is connected between the inputs and an intermediate node, and the at least one second logic stage means is connected between the intermediate node and the output, and wherein the logic stage means are arranged such that a logic path from one of the inputs of the logic circuit to the output of the logic circuit comprises an even number of logic stage means.

31. A logic device for calculating an encrypted result operand from a first encrypted input operand and a second encrypted input operand according to a combination rule, comprising:

a first input means for receiving the first encrypted input operand;

a second input means for receiving the second encrypted input operand;

an output means for outputting the encrypted result operand;

wherein each operand comprises a first logic state or a second logic state; and at least one first logic means and at least one second logic means, wherein the at least one first logic means is connected between the inputs and an intermediate node, and the at least one second logic means is connected between the intermediate node and the output, and wherein the first and the second logic means are arranged such that a logic path from one of the input means of the logic device to the output of the logic device comprises an even number of logic means, wherein the logic means are formed to calculate the first or second logic state of the encrypted result operand from the input operands according to the combination rule and to impress the same at the output means, and wherein the logic device is formed so that the logic state of the encrypted result operand is maintained or changed exactly once, independently of an order of arrival of the encrypted input operands, depending on the combination rule.

* * * * *